United States Patent [19]

Kawahara et al.

[11] Patent Number: 5,428,421
[45] Date of Patent: Jun. 27, 1995

[54] EXPOSURE CONTROL DEVICE

[75] Inventors: Hideo Kawahara, Saitama; Hideyuki Arai, Kanagawa, both of Japan

[73] Assignee: Canon Kabushiki Kaisha, Tokyo, Japan

[21] Appl. No.: 287,463

[22] Filed: Aug. 8, 1994

Related U.S. Application Data

[63] Continuation of Ser. No. 26,274, Mar. 4, 1993, abandoned, which is a continuation of Ser. No. 906,042, Jun. 26, 1992, abandoned, which is a continuation of Ser. No. 484,539, Feb. 23, 1990, abandoned.

[30] Foreign Application Priority Data

Feb. 27, 1989 [JP] Japan .................................. 1-045710
Feb. 27, 1989 [JP] Japan .................................. 1-045711
Mar. 30, 1989 [JP] Japan .................................. 1-076563
Apr. 7, 1989 [JP] Japan .................................. 1-088523

[51] Int. Cl.⁶ ............................................. G03B 7/08
[52] U.S. Cl. ..................................... 354/446; 348/363
[58] Field of Search ............... 354/425, 427, 446, 449, 354/451–453, 271.1; 348/362–366

[56] References Cited

U.S. PATENT DOCUMENTS 4,471,383  9/1984  Shiono et al. ...................... 358/228
4,959,728  9/1990  Takahashi et al. .................. 358/228

Primary Examiner—David M. Gray
Attorney, Agent, or Firm—Robin, Blecker, Daley & Driscoll

[57] ABSTRACT

An exposure control device which permits exposure control either in an automatic mode or in a manual mode is arranged to smoothly perform the exposure control by holding exposure control information obtained immediately before change-over of the exposure control mode from one mode over to the other; and is provided with a correction circuit for uniformalizing an iris driving characteristic for the whole iris driving range by correcting the non-linearity of the characteristic.

17 Claims, 29 Drawing Sheets

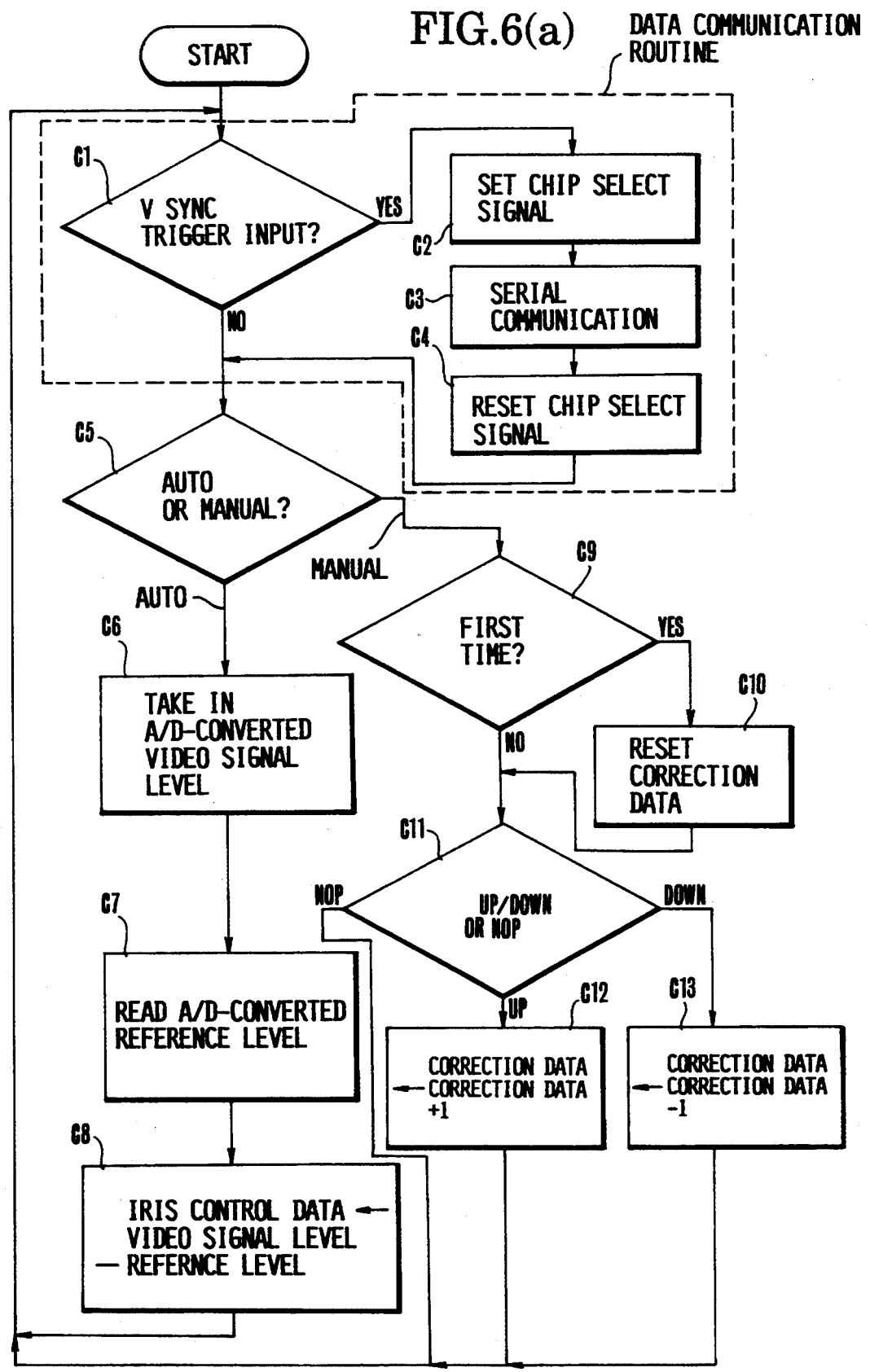

ACTUATOR MOVING DEGREE - F NO. CHARACTERISTIC

VARIATION OF OUTPUT OF ARITHMETIC UNIT (REFERENCE: CURRENT STATE)

| F No. | ... | 2 | ~ | 2.8 | ~ | 4 | ~ | 5.6 | ~ | 8 | ~ | 11 | ~ | 16 | ... |
|---|---|---|---|---|---|---|---|---|---|---|---|---|---|---|---|
| Gain | | ×4 | | ×2.8 | | ×2 | | ×1.4 | | ×1 | | ×0.7 | | ×0.5 | ×0.35 |

GAIN CHARACTERISTIC COMPARISON

EXPOSURE CONTROL DEVICE

This is a continuation application under 37 CFR 1.62 of prior application Ser. No. 08/026,274 filed Mar. 4, 1993, now abandoned, is a continuation of Ser. No. 07/906,042, filed Jun. 26, 1992, now abandoned, is a continuation of Ser. No. 07/484,539, filed Feb. 23, 1990, now abandoned.

BACKGROUND OF THE INVENTION

1. Field of the Invention

This invention relates to an exposure control device employed in an image sensing apparatus.

2. Description of the Related Art

The recent advancement of video apparatuses such as a video tape recorder (hereinafter referred to as a VTR for short) is conspicuous. As a result, the camera-integrated type VTRs or the like are generally equipped with automatic exposure adjusting devices.

FIG. 1 of the accompanying drawings shows a typical example of the conventional exposure control method heretofore employed for a camera-integrated type VTR. Referring to FIG. 1, a light flux coming through an optical system 1 forms an object's image on a image sensor 3 after the quantity of light is adjusted by an exposure adjustment device 2 (hereinafter referred to as an iris). A signal thus obtained from the image sensor 3 is supplied to a camera signal processing circuit 4. The circuit 4 processes the signal including gamma correction, etc., and separates the signal into a luminance signal and a chrominance signal. A camera encoder 5 is arranged to convert these outputs of the camera signal processing circuit 4 into a TV signal which is in conformity with, for example, the NTSC system. Meanwhile, an image luminance signal Y which is obtained from the camera signal processing circuit 4 without undergoing the gamma correction process is supplied to an integrator 6. The integrator 6 performs an integrating process. The integrated luminance signal is supplied to an arithmetic unit 7. The arithmetic unit 7 generates a difference signal indicating a difference between the luminance signal and a predetermined reference value 8. The difference signal is supplied as an exposure control signal to a driver 9. In accordance with the exposure control signal, the driver 9 and an actuator 10 control the aperture position of the iris 2 (a stop device for exposure adjustment) in such a way as to bring the output of the integrator 6 into a given relation to the predetermined reference value 8.

The conventional automatic exposure control device, however, has presented the following problems:

An exposure intended by the photographer does not always turn out to be apposite for an object to be photographed. For example, in cases where the object has a light source in the background under a so-called counter-light condition or where the object is solely illuminated in a dark place, the video camera performs light measurement by averaging the light of a wide area including the background besides the object. Therefore, the camera makes an under-exposure in the former case and an over-exposure in the latter case.

To solve this problem, some of the video cameras of the kind having automatic exposure control devices are provided with manual exposure control means for permitting the photographer to manually set the camera into a desired exposure effecting state by switching it from an automatic exposure control mode over to a manual exposure control mode in cases where the desired exposure is not possible with the automatic exposure control device. However, at the time of switch-over from an automatic exposure operation to a manual exposure operation of the conventional video camera of this kind, the iris is operated incontinuously from its state obtained before the switch-over and thus gives an unnatural picture.

Further, a second problem of the conventional automatic exposure control device lies in that an aperture control signal is obtainable only for a linear process. In response to a change in the signal, the moving degree of the actuator changes to a degree in relation to the stopping-down degree of the iris and not in exact conformity to the signal change. The actuator moves to a less degree on the maximum aperture side and to a greater degree on the minimum aperture side.

Considering this in respect to a feedback system including the video signal, the feedback loop gain of the system increases accordingly as the iris position is stopped-down from its full open state and decreases accordingly as the iris is opened from a stopped-down aperture position. In other words, the quantity of light varies to a less degree when the iris aperture changes within a range near the full open position of the iris. However, the luminosity on an image sensing plane varies to a greater degree accordingly as the iris position comes nearer to the minimum aperture in response to even a very small change in the aperture. This causes a change in the responsivity of the feedback loop of iris control. Therefore, the moving degree of the actuator tends to increase accordingly as the iris aperture is stopped down. This not only causes hunting on the side of stopped-down aperture values but also prevents smooth aperture control.

FIG. 2 shows another example of the conventional automatic exposure control device including manual exposure control means. The same component parts as those of FIG. 1 are indicated by the same reference numerals.

Referring to FIG. 2, a light flux which comes through an optical system 1 forms an object's image on an image sensor 3 after light quantity adjustment by an exposure adjustment device (or an iris) 2. A signal obtained by the image sensor 3 is supplied to a sample-and-hold circuit 11 to be sampled in a given cycle. The sampled signal is supplied to a camera signal processing circuit 4 to be subjected to various processes including gamma correction, etc. At the circuit 4, the signal is separated into a luminance signal and a chrominance signal. These signals are supplied to a camera encoder 5 to be converted into a TV video signal which is in conformity to, for example, the NTSC system.

Meanwhile, an image luminance signal Y which is also output from the sample-and-hold circuit 11 is integrated by an integrator 6. The integrated signal is supplied to an arithmetic unit 7 to be compared with a reference value 8a predetermined by a reference level setting variable resistor 8. The arithmetic unit 7 then generates a difference signal according to a difference between the two. The difference signal is supplied as an exposure control signal to a driver 9 and an iris driving actuator 10. The aperture of the iris 2 is controlled in such a way as to have the output level of the integrator 6 in a give relation to the reference value which has been set by the reference level setting variable resistor 8. The iris 2 is thus controlled by the above-stated feedback loop.

A variable resistor 12 for manual exposure control is arranged to permit manual control over the exposing state of the iris 2. The set value of the above-stated reference level setting variable resistor 8 can be changed by operating the manual exposure control variable resistor 12. The aperture position of the iris 2 is thus manually adjustable to the set reference value.

However, the above-stated device has presented a third problem which is as follows: according to the arrangement of the device, the voltage of the reference value 8a of the reference level setting variable resistor 8 is simply varied while the position of the iris is always varying with the quantity of incident light. It is, therefore, difficult to set the camera in the optimum exposure state as desired.

Further, the iris control means for controlling the aperture in the manual exposure control mode is formed solely with the variable resistor which varies the reference value to be supplied to the feedback loop. It is, therefore, difficult to smoothly and finely adjust the aperture to the optimum value in the manual mode.

Meanwhile, the moving degree of the iris controlling actuator which is arranged to move in response to a change in the iris control signal varies in relation to the opening degree of the iris. The actuator, therefore, moves to a less degree on the side of larger opened aperture values and to a greater degree for stopped-down aperture values. FIG. 8 shows this relation of aperture values to the moving degree of the actuator.

In the case of the feedback system of the above-stated device including the video signal, the loop gain of the feedback loop increases accordingly as the iris is stopped-down from its full open position and decreases accordingly as it is opened from the stopped-down position. In other words, the quantity of light changes to a less degree in response to a change in the iris aperture when the iris is in a position near to its maximum aperture. However, the light quantity changes to a greater degree to bring about a salient change in the luminosity of the image sensing plane, in response to even a slight degree of change in the aperture, accordingly as the the aperture is stopped-down further. This causes a change in the responsivity of the feedback loop of iris control. The moving degree of the actuator thus tends to increase accordingly as the iris is stopped-down to a greater extent. As a result, hunting takes place when the iris is within the range of stopped-down aperture values. Besides, the iris control cannot be smoothly accomplished.

When the iris is manually controlled in particular, the actual stopping-down degree of iris aperture obtained in response to a certain degree of operation while the iris is in a smaller aperture position greatly differs from the degree obtained in response to the same degree of operation while the iris is within the range of larger aperture positions. This makes it difficult to obtain an optimum value by manual exposure control.

Further, the automatic iris control system of the conventional video camera of this kind has presented a fourth problem which is as follows: the circuit of the system has been arranged to have the same gain both for a change of the aperture of the iris (stop) from a maximum aperture to a smaller aperture according to the brightness of the object and for a change of the aperture from the smaller aperture toward the maximum aperture.

However, in accordance with the above-stated conventional method, the apparent loop gain of the automatic iris control system is higher when the brightness of the object changes, for example, from a dark state to a bright state, to cause the iris 2 to change from the maximum aperture position to a stopped-down (smaller) aperture position than when the the object's brightness changes from a bright state to a dark state to cause the iris 2 to change from a smaller position toward a maximum aperture position. The response speed of the operation of the system obtained in changing the iris 2 from a larger aperture to a smaller aperture differs from the speed obtained in changing it from a smaller aperture to a larger aperture.

Therefore, if the circuit gain is determined in such a way as to prevent the iris operation from hunting in changing a large aperture to a smaller aperture, the response speed becomes too slow and results in an unnatural automatic iris control action in changing the iris from a smaller aperture to a larger aperture.

SUMMARY OF THE INVENTION

It is a first object of this invention to solve all the above-stated problems of the prior art.

It is a second object of the invention to provide a camera system which includes an exposure control device and a lens unit which is provided with the exposure control device and is capable of solving particularly the first problem mentioned in the foregoing. The exposure control device is arranged to retain exposure information which is obtained before change-over from one exposure control mode to another, so that the exposure control mode change-over can be smoothly accomplished without any incontinuous change of exposure due to the change-over.

It is a third object of the invention to provide a camera system including an exposure control device and a lens unit provided with the exposure control device, wherein exposure information which is obtained immediately before change-over to a manual exposure control mode is retained and used in such a way as to prevent the aperture of the camera system obtained before the change-over from becoming incontinuous after the change-over, so that the change-over can be smoothly accomplished.

It is a fourth object of the invention to provide an exposure control device wherein, in the event of change-over from one exposure control mode to a different exposure control mode, exposure information obtained before the change-over is retained, so that the exposure control mode change-over can be smoothly carried without any incontinuous change caused by the change-over in the state of an exposure.

Under this object, an exposure control device arranged as a preferred embodiment of this invention to be capable of setting a plurality of exposure control modes comprises mode selection means for change-over from one exposure control mode to another; exposure information storing means for storing exposure information; and control means arranged to cause the storing means to store exposure information obtained immediately before the change-over when one exposure control mode is changed to another and to cause the stored exposure information to be supplied and used as initial information in the new exposure control mode obtained after the change-over.

It is a fifth object of the invention to provide an exposure control device which is capable of performing smooth change-over to a manual exposure control mode by holding information on an aperture value detected immediately before the change-over, so that the aperture value obtained before the change-over can be prevented from being incontinuously changed after the change-over.

Under that object, an exposure control device which is arranged as a preferred embodiment of this invention to be capable of setting an automatic exposure control mode in which an exposure effecting state is automatically controlled and a manual exposure control mode in which the exposure can be manually controlled comprises selection means for change-over from one of the exposure control modes to the other; aperture information detecting means for detecting exposure information; holding means for holding the output of the aperture information detecting means obtained immediately before the change-over to the manual exposure control mode is effected by the selection means; and comparison means for comparing the output of the holding means with the output of the aperture information detecting means to output exposure control information.

It is a sixth object of the invention to provide an exposure control device whereby when one of a plurality of different exposure control modes is changed over to another, an aperture value obtained immediately before the change-over is retained; and, in the exposure control mode after the change-over, the aperture value retained is used as an initial value and is adjusted as necessary. Therefore, one exposure control mode can be smoothly changed over to another to facilitate exposure compensation. The exposure control device is, therefore, capable of preventing any unnatural picture that otherwise results from an incontinuous or abrupt change in an exposure effecting state due to its incontinuity.

It is a seventh object of the invention to solve the second problem of prior art stated in the foregoing.

It is an eighth object of the invention to provide an exposure control device for smooth aperture control, whereby in a feedback control system for controlling the opening degree of an iris stop on the basis of changes in the quantity of incident light passing through the iris, any change in the gain of a feedback loop that is caused by a change in the aperture value is reversely corrected, so that an apparent loop gain can be kept nearly unvarying irrespective of the aperture value.

Under the above stated object, a preferred embodiment of this invention comprises iris control means for controlling an exposure effecting state by driving the iris according to a change in the quantity of light passing through the iris; detection means for detecting information on the aperture of the iris; and correction means for controlling the changing degree of the exposure effecting state by correcting the aperture control value of the iris control means in a manner inverse to the characteristic of the iris control means on the basis of the output of the detection means.

It is a ninth object of the invention to provide an exposure control device for a video camera or the like wherein there are provided an iris; an actuator for driving the iris; and a correction system of an inverse characteristic for correcting the non-linearity of the loop gain of an exposure control system caused by an aperture value according to the characteristic of an aperture value detecting encoder. This arrangement enables the device to have a substantially unvarying loop gain. The iris driving characteristic varies to a great degree according to changes in the aperture value, so that the operability of the device can be prevented from deteriorating. Particularly, the iris stop can be prevented from hunting for smaller aperture values, so that aperture control can be smoothly and stably carried out.

It is a tenth object of the invention to provide an exposure control device, wherein the correcting characteristic of the iris control system is programmed beforehand in the form of a table within a microcomputer; in the case of a camera system having an interchangeable lens, control and correction data is simply stored on the side of the lens unit according to the characteristic of the iris of its lens optical system. The exposure control device is thus arranged to give a great advantage in terms of the interchangeability of the lens. The exposure control device under the tenth object is arranged to solve the third problem of the prior art mentioned in the foregoing. The device enables a camera and a lens unit to permit a smooth manual control over the whole operation range of the iris irrespective of the aperture value thereof.

It is an eleventh object of the invention to provide an exposure control device whereby an optimum exposure condition can be easily and accurately set as desired by the photographer. Further, in the case of a manual exposure control operation on an interchangeable lens system, an exposure degree adjusting action can be most appositely carried out irrespective of the kind of lens, the kind of camera or their combination.

It is a twelfth object of the invention to provide an exposure control device which includes a correcting system of an inverse characteristic for correcting the non-linearity of the loop gain of an iris aperture control system due to aperture values and whereby the loop gain can be obtained in a substantially unvarying state irrespective of the aperture value. The iris driving characteristic is varied to a great degree according to the aperture value, so that the iris can be prevented from hunting particularly on the side of its smaller aperture positions. The device thus enables the aperture control to be smoothly and stably accomplished.

Under the above stated object, an exposure control device which is arranged according to this invention as a preferred embodiment thereof comprises iris driving means which is arranged to change an exposure degree by driving an iris (stop); operation means provided for setting the exposure state of the iris; detecting means for detecting information on the aperture value of the iris; and control means for controlling the iris driving means on the basis of an operation degree set by the operation means. The above-stated aperture control means is arranged to change the aperture changing degree of the iris relative to the operation degree in accordance with the aperture value detected by the detecting means. With the device arranged in this manner, in a feedback control system which controls the opening degree of the iris on the basis of changes in the quantity of incident light passing through the iris aperture, a change in the loop gain of a feedback loop resulting from a change in the aperture value can be reversely corrected, so that an apparent loop gain can be kept unvarying irrespective of the aperture value of the iris.

It is a thirteenth object of the invention to provide an exposure control device which is capable of smoothly performing aperture control by programming the correcting characteristic of an aperture control system beforehand in the form of a table within a microcomputer and, in the case of a camera system using an interchangeable lens, advantageously ensures the interchangeability of the lens by storing, on the side of the lens unit, control and correction data suited to the characteristic of a stop or iris of its lens optical system.

It is a fourteenth object of the invention to provide an exposure control device which permits an aperture correcting characteristic to be set by means of an operation part, so that the arrangement of control system circuits ensuing the operation part can be simplified.

It is a fifteenth object of the invention to provide an iris control system which is arranged to be capable of causing an iris to act at an optimum response speed in both aperture changing directions under automatic or manual aperture control.

To attain this object, in an image sensing apparatus, an automatic iris control system which is arranged as a preferred embodiment of this invention comprises a control system which substantially optimizes the response speed of the stop member of the lens of an optical system irrespective of the position shifting state of the stop member; and driving means for driving the stop member to shift the position thereof. The arrangement substantially ensures that the stop member (or an iris stop) acts at an optimum response speed for any change in the brightness of an object to be photographed.

The above and other objects and features of the invention will become apparent from the following detailed description of embodiments thereof taken in connection with the accompanying drawings.

BRIEF DESCRIPTION OF THE DRAWINGS

FIGS. 6(a) and 6(b) are flow charts showing the iris control operation of the second embodiment.

DETAILED DESCRIPTION OF THE PREFERRED EMBODIMENTS

Figure 3:
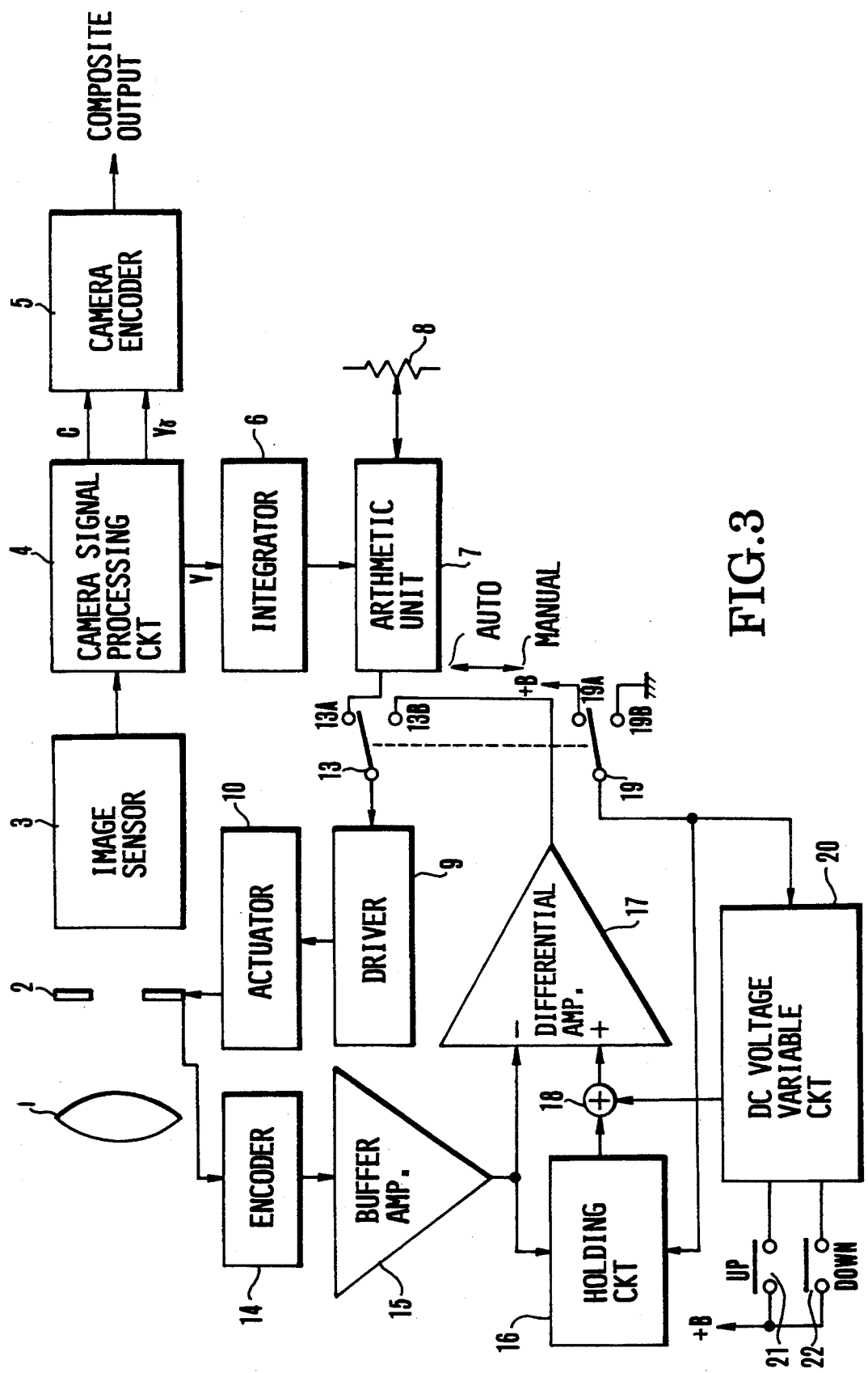
FIG. 3 is a block diagram showing the whole arrangement of a first embodiment of this invention.

The following describes the details of the exposure control device of this invention through embodiments thereof with reference to the drawings:

FIG. 3 shows in a block diagram an automatic exposure control device arranged as a first embodiment of this invention. In FIG. 3, the parts arranged in the same manner as those of the conventional device described in the foregoing are indicated by the same reference numerals and the details of them are omitted from description.

A lens optical system 1 is arranged to form through an iris 2 an object's image on the image sensing plane of an image sensor 3 which is a CCD or the like. The image sensor 3 photo-electrically converts the object's image into an image signal. The image signal is supplied from the image sensor 3 to a camera signal processing circuit 4 to be subjected to various processes including gamma correction, etc. As a result, the signal processing circuit 4 produces a chrominance signal C and a luminance signal Yγ which are supplied to an encoder 5. The encoder 5 converts these signals into a composite video signal conforming to, for example, the NTSC system. The composite video signal is then output from a camera part.

Meanwhile, the camera signal processing circuit 4 produces also a luminance signal Y which is not gamma converted. The luminance signal Y is supplied to an integrator 6 to be integrated there for the purpose of controlling the iris 2 for an exposure apposite to the luminance state of a picture. The integrated luminance signal is supplied to an arithmetic unit 7 to be compared with a reference value 8. The arithmetic unit 7 generates, as a result of comparison, a difference signal according to a difference between the two inputs. This difference signal is supplied to an actuator 10 via a switch 13 and a driver 9 as an exposure control signal (or as iris control data). The iris 2 is thus controlled accordingly.

Meanwhile, an encoder 14 which is composed of, for example, a Hall element is arranged to detect the position of the iris 2, i.e., an aperture value. A signal output from the encoder 14 as a result of detection is amplified to a given level by a buffer amplifier 15. The output of the buffer amplifier 15 is supplied to the inverting input terminal of a differential amplifier 17 and also to a holding circuit 16 which is arranged to hold the output of the buffer amplifier 15.

The output of the holding circuit 16 is supplied to an adder 18 to be added to the output of a DC voltage variable circuit 20. The sum output of the adder 18 is supplied to the non-inverting input terminal of the differential amplifier 17. The DC voltage variable circuit 20 is arranged to vary the level of a DC voltage to be supplied to the adder accordingly as an up switch 21 or a down switch 22 is operated. In other words, the DC voltage level supplied from the holding circuit 16 to the non-inverting input terminal of the differential amplifier 17 is variable by changing the voltage output level of the DC voltage variable circuit 20. Therefore, the aperture value data which is held at the holding circuit 16 is adjustable as desired. The details of this will be described later herein.

The output of the arithmetic unit 7 is allowed to be supplied to the driver 9 when the connecting position of the switch 13 is shifted to one contact 13A thereof. Then, an automatic exposure control mode is effected in which the iris 2 is automatically controlled by the iris control data signal output from the arithmetic unit 7. When the position of the switch 13 is shifted to another contact 13B, the output of the differential amplifier 17 is supplied to the driver 9 to control the iris 2 according to the voltage output from the differential amplifier 17. Under this condition, the iris 2 can be controlled by adjusting the output of the differential amplifier 17 using the output of the adder 18 which is the sum of the output of the holding circuit 16 and that of the DC voltage variable circuit 20. In other words, the iris 2 can be manually controlled by operating the up or down switch 21 or 22 to vary the output voltage level of the DC voltage variable circuit 20.

Another switch 19 is interlocked with the switch 13 and its position changes in association with the switch 13. The position of the switch 19 is shifted to one contact 19A when that of the switch 13 is shifted to the contact 13A for the automatic exposure control mode, and to another contact 19B when the position of the switch 13 is shifted to the other contact 13B for the manual exposure control mode. When the switch 19 is on the side of the contact 19A, a high level control signal +B is supplied respectively to the DC voltage variable circuit 20 and to the holding circuit 16 to invalidate their actions respectively. When the switch 19 is on the side of the other contact 19B, a low level control signal is supplied to the DC voltage variable circuit 20 and to the holding circuit 16. This enables the holding circuit 16 to hold the voltage output from the buffer amplifier 15 which corresponds to an aperture value obtained at the point of time when the exposure control mode is switched over to the manual exposure control mode. The voltage thus held by the circuit 16 is supplied to the adder 18. Meanwhile, the DC voltage to be supplied to the adder from the DC voltage variable circuit 20 is varied according to the operation performed on the up or down switch 21 or 22. The aperture of the optical system thus becomes manually adjustable by using as a reference aperture value the aperture value of the iris 2 held at the holding circuit 16.

The information on the aperture value from the aperture information detector which is not used in the automatic exposure control mode is thus arranged to be activated and held immediately before the change-over to the manual control. Then, the manual exposure control is performed with this aperture value used as an initial value. Therefore, the change-over from automatic control mode to the manual control mode can be smoothly effected without an abrupt change between aperture values obtained before and after the exposure control mode change-over.

With the voltage of the DC voltage variable circuit 20 arranged to be adjusted in the above-stated manner, the aperture value held by the holding circuit 16 can be changed as desired by shifting the voltage supplied via the adder 18 to the non-inverting input terminal of the differential amplifier 17.

Figure 4:
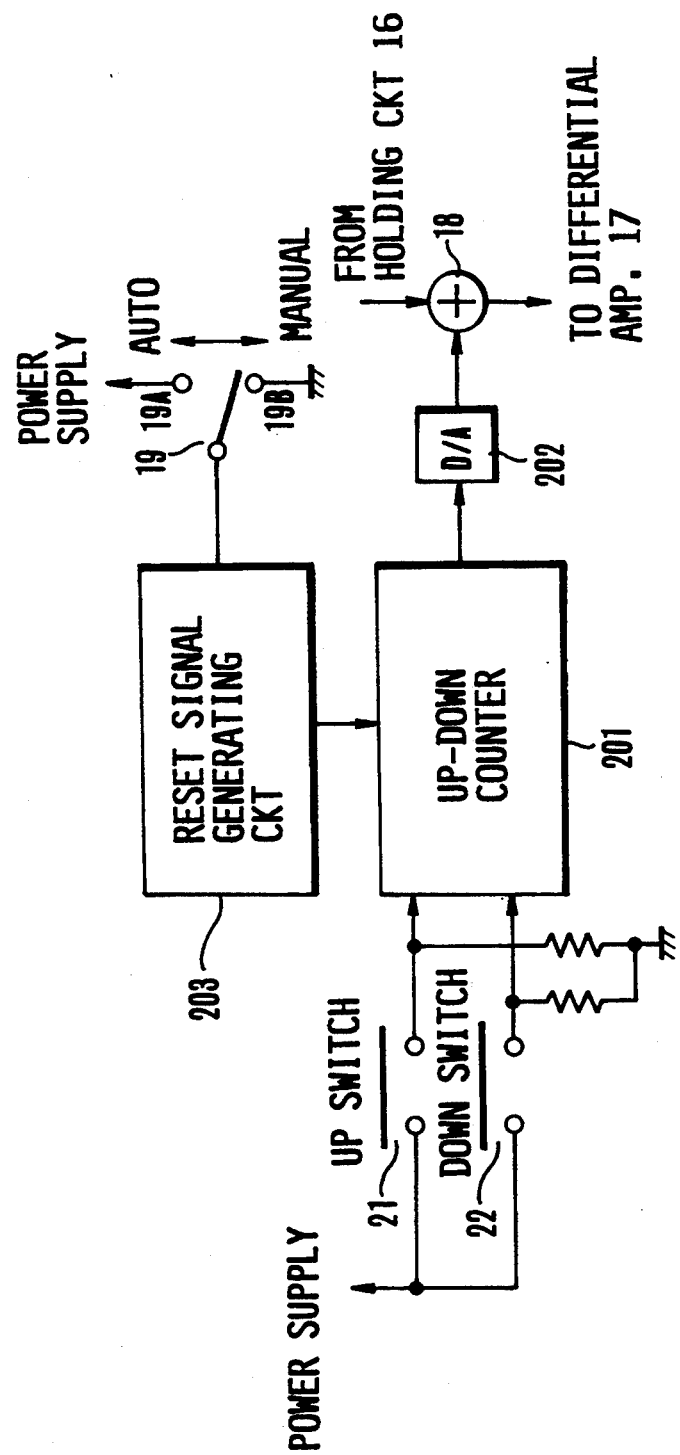
FIG. 4 is a block diagram showing the arrangement and operation of essential parts provided for manual correction of an aperture value according to the invention.

The details of the DC voltage variable circuit 20 are as shown in FIG. 4. Referring to FIG. 4, a given power supply voltage is supplied to an up-down counter 201 when the up switch 21 or the down switch 22 is pushed. If the up switch 21 is pushed, the counter 201 up counts to have the iris 2 driven to open stepwise. If the down switch 22 is pushed, the counter 201 down counts to have the iris 2 driven stepwise in the direction of closing. The output of the counter 201 is supplied to a digital-to-analog (hereinafter referred to as D/A) converter 202 to be converted into an analog voltage. The analog voltage is supplied to the adder 18. A reset signal generating circuit 203 is arranged to generate a reset signal when the automatic exposure control mode is changed to the manual control mode. At the time of this change-over, the reset signal causes the output of the counter 201 to be set at a predetermined reference value in such a way as to make the output of the D/A converter 202 zero.

With the embodiment arranged in the above-stated manner, under a normal shooting condition, the positions of the switches 13 and 19 are respectively set at their contacts 13A and 19A for the automatic exposure control mode. In the automatic mode, the driver which drives the iris driving actuator 10 operates under the control of the iris control signal output from the arithmetic unit 7, irrespective of the operation on the up and down switches, to cause the iris 2 to be driven in such a manner as to make the video (or image) signal level unvarying.

When the positions of the switches 13 and 19 are respectively shifted to their contacts 13B and 19B to select the manual exposure control mode, the output of the buffer amplifier 15 which represents an aperture value obtained immediately before the change-over to the manual mode is held by the holding circuit 16. At the same time, the iris controlling DC voltage which is supplied to the adder 18 according to an operation of the up or down switch becomes adjustable. The iris control voltage which is supplied to the non-inverting input terminal of the differential amplifier 17 thus can be changed from the aperture value which is held at the holding circuit 16 as an initial value after the change-over. The output of the differential amplifier 17 then drives the driver 9 in such a way as to make the level of its non-inverting input terminal equal to the level of the DC voltage supplied from the buffer amplifier 15, In other words, the aperture position of the iris 2 can be adjusted to an aperture value which is set by a manual operation of the up switch or the down switch.

As mentioned above, when the automatic exposure control mode is changed over to the manual exposure control mode, the aperture value obtained immediately before the change-over is retained. The manual aperture control begins from this aperture value. Therefore, the change-over to the manual control mode can be smoothly and stably effected as the aperture value is smoothly changeable without showing any incontinuous changes.

Figure 5:
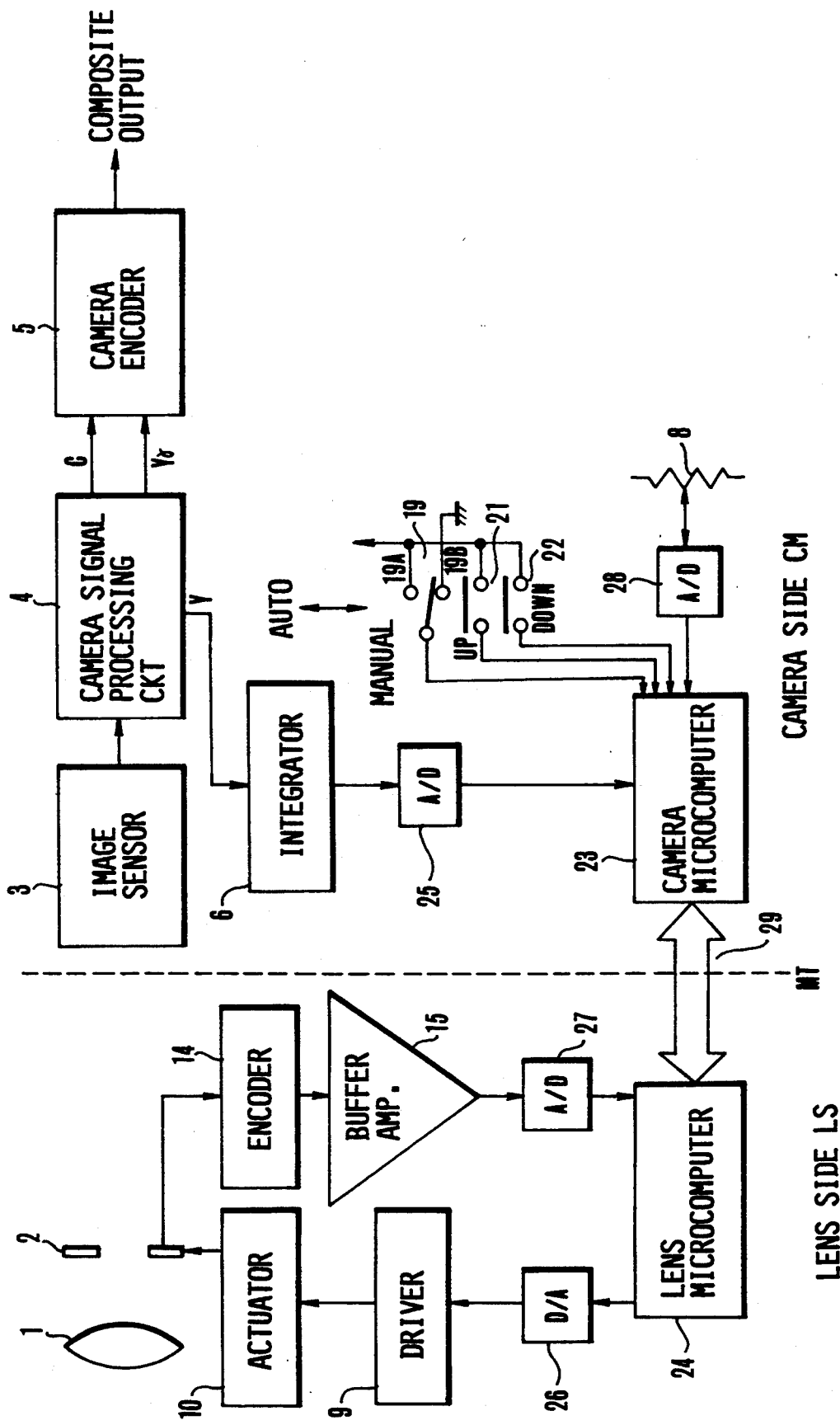
FIG. 5 is a block diagram showing the whole arrangement of a second embodiment of this invention.
Figure 6B:
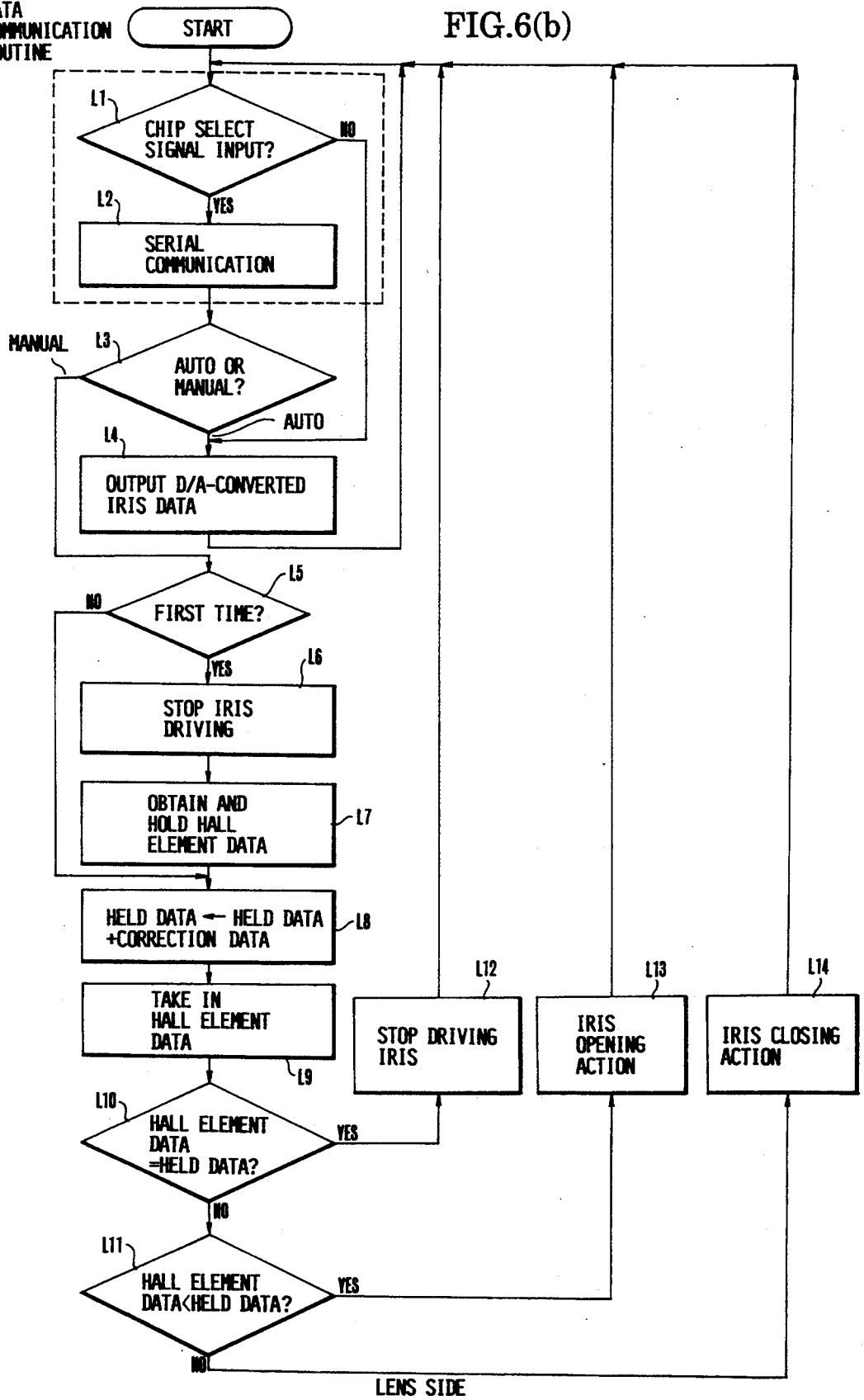

A second embodiment of the invention is arranged as shown in FIGS. 5, 6(a) and 6(b). In this case, the invention is applied to a video camera which permits use of an interchangeable lens. The functions of the holding circuit 16, the differential amplifier 17, the adder 18 and the DC voltage variable circuit 20 of the first embodiment shown in FIG. 3 are arranged to be carried out by means of a microcomputer which is disposed on the side of the camera body.

FIG. 5 shows in a block diagram the video camera arranged to use an interchangeable lens. In FIG. 5, the same component parts as those of FIG. 3 are indicated by the same reference numerals and the details of them are omitted from the description. The illustration includes a lens unit LS and a camera unit CM. They are coupled with each other by a mount part MT. The mount part MT is provided with a data communication line 29 for exchange of data between the camera unit CM and the lens unit LS through electrical contacts which are not shown. Since the communication between the camera unit CM and the lens unit LS is conducted on the basis of a TV signal processing operation performed on the side of the camera unit, the communication is conducted in synchronism with a vertical synchronizing (hereinafter abbreviated as sync) signal Vsync.

Within the camera unit CM, an image sensor 3, a camera signal processing circuit 4, a camera encoder 5 and an integrator 6 are arranged in the same manner as in FIG. 3. In the case of the second embodiment, the output of the integrator 6 is supplied, after it is converted into digital data by an A/D converter 25, to a microcomputer 23 which is arranged to control the camera side (hereinafter referred to as camera microcomputer). Further, a reference value 8 for iris control is supplied through an A/D converter 28 to camera microcomputer 23.

The switch 19 of FIG. 3 which is provided for change-over of the exposure control mode between the automatic and manual control modes and the up and down switches 21 and 22 for exposure adjustment in the manual mode are disposed on the side of the camera unit CM. Information on the operating states of these parts is also supplied to the camera microcomputer 23.

A luminance signal Y which is output from the camera signal processing circuit 4 is supplied to the integrator 6 for the purpose of generating a control signal to control the iris 2 for an exposure apposite to the luminance state of an image plane in the same manner as in the case of the first embodiment. After the integrator 6, the luminance signal Y is supplied to the camera microcomputer 23 through the A/D converter 25. At the same time, the reference voltage 8 is also supplied to the camera microcomputer 23 after it has been converted into a digital form by the A/D converter 28.

The camera microcomputer 23 is arranged to perform a given computing operation on these digital inputs to obtain an iris control data according to a difference between these inputs. The iris control data thus obtained is sent via a data communication line 29 to a microcomputer 24 disposed on the side of the lens unit LS.

The lens unit LS is arranged as follows: the lens unit LS includes the microcomputer 24 (hereinafter referred to as lens microcomputer). The lens microcomputer 24 computes iris control data on the basis of the control data sent via the communication line 29 from the camera microcomputer 23 and supplies the iris control data thus obtained to a driver 9 through a digital-to-analog (D/A) converter 26. The driver 9 drives an actuator 10 to control the iris 2 accordingly. An iris encoder 14 detects an aperture value of the iris 2 and produces aperture value data. The aperture value data is supplied to a buffer amplifier 15. The output of the buffer amplifier 15 is converted into a digital signal by an A/D converter 27 and supplied to the lens microcomputer 24.

The lens microcomputer 24 processes the iris control data received from the camera microcomputer 23. This data is converted into an analog signal by the D/A converter 26. The analog signal is used for driving and controlling the iris 2 through the driver 9 and the actuator 10.

In the automatic exposure control mode, as mentioned above, the iris control data is computed within the camera unit according to a difference between the average level of the luminance signal and the reference value 8. The iris control data is transmitted to the lens unit. On the side of the lens unit, the iris is driven and controlled according to the control data. The exposure state of the video camera is thus controlled in such a way as to keep the average level of the luminance signal in a given relation to the reference value 8.

When the video camera is shifted from the automatic exposure control mode to a manual exposure control mode by means of an automatic-manual change-over switch 19 in the same manner as in the case of the first embodiment, the second embodiment operates as follows:

A signal indicating the operating state of the switch 19 is taken into the camera microcomputer 23. Then, information on the change-over to the manual exposure control mode is sent via the data communication line 29 from the camera microcomputer 23 to the lens microcomputer 24 as an instruction for the manual exposure control mode.

Upon receipt of the instruction for the manual exposure control mode, the lens microcomputer 24 outputs to the D/A converter 26 the control data for stopping and preventing the iris 2 from acting from its current aperture position. Then, the encoder 14 detects the current aperture position of the iris 2 and produces information on the aperture value. The aperture value information output from the encoder 14 is amplified by the buffer amplifier 15 and is then converted into a digital value by the A/D converter 27. The digital data thus obtained is supplied to the lens microcomputer 24. The aperture value data thus obtained is stored and kept by a storage circuit disposed within the lens microcomputer 24.

After the lapse of a given period of time, the data of the aperture value of the iris 2 is periodically taken into the lens microcomputer 24 via the encoder 14, the buffer amplifier 15 and the A/D converter 27. The iris aperture value which is thus periodically obtained is compared with the aperture value stored by the storage circuit according to a control program which is provided within the lens microcomputer 24 and will be described later. The lens microcomputer 24 then produces iris control data in such a way as to make these values equal to each other. The aperture value of the iris 2 which is obtained at the time of change-over to the manual mode is thus arranged to be retained by the lens microcomputer 24.

While the iris 2 is kept under the above-stated manual exposure control condition, the aperture value of the iris 2 can be adjusted as desired by performing, from the camera unit via the data communication line 29, an adding or subtracting operation by means of the up switch 21 or the down switch 22 within a given range on the value which is stored by the storage circuit.

FIGS. 6(a) and 6(b) show in flow charts the iris control operation of the second embodiment. The operation performed on the side of the camera unit CM is first described below with reference to FIG. 6(a):

Step C1: A check is made for the input of a given number of vertical sync signals Vsync (vertical sync signal included in the video signal) which is to be used in setting the timing of communication with the lens unit LS. Step C2: If the given number of vertical sync signals are found to have been obtained, a chip select signal is set. Step C3: The iris data is parallel-to-serial converted and is sent from the camera unit to the lens unit. Step C4: The chip select signal is reset.

If the given number of vertical sync signals Vsync are found not to have been received at the step C1, no communication is performed with the lens unit LS. Then, the flow of operation comes to a step C5 to perform a processing operation only within the camera unit CM.

Step C5: A selection is made between an automatic exposure control mode and a manual exposure control mode. Step C6: If the automatic exposure control mode is selected, the video signal level data output from the integrator 6 via the A/D converter 25 is read into the camera microcomputer 23. Step C7: The level of the reference value 8 which is A/D converted by the A/D converter 28 is read into the camera microcomputer 23. Step C8: A computing operation (iris control data=video signal level−reference level) is performed. The flow then comes back to the step C1 to repeat the flow of operation described above.

Step C9: If the selection of the manual exposure control mode is found at the step C5, a check is made to find if the camera is set in the manual exposure control mode immediately before. If so, the flow comes to a step C10. Step C10: The value of iris correction data stored within the camera microcomputer 23 is reset at "0". The iris correction data represents a correction value which is set, in the manual exposure control mode, by means of the up or down switch and to be sent from the camera unit to the lens unit for the purpose of manually varying the aperture value which is obtained at the time of mode change-over and is stored within the lens microcomputer 24.

Step C11: A check is made to see if the up switch (button) 21 or down switch 22 which are provided for setting an exposure in the manual exposure control mode is pushed or not pushed. If not, the flow comes back to the step C1. If the up switch 21 which is for driving the iris in the direction of opening it is found to have been pushed, the flow come to a step C12.

Step C12: "1" is added to the iris correction data stored to obtain new iris correction data. The new iris correction data is stored within the camera microcomputer 23. The flow then comes back to the step C1.

More specifically, the camera microcomputer 23 is provided with a counter which is arranged like the up-down counter 201 of FIG. 4 for the purpose of setting an iris correcting degree. A new correction value for shifting the iris 2 to a larger aperture position is set at this counter at the step C12.

Step C13: If the down switch 22 which is provided for driving the iris 2 in the iris closing direction is found to have been pushed at the step C11, "1" is subtracted from the iris correction data stored. New iris correction data thus obtained is stored within the camera microcomputer and then the flow comes back to the step C1. Like in the case of the step C12, a correction degree for shifting the iris 2 to a smaller aperture position is thus set within the camera microcomputer 23.

The above-stated control action is repeated for controlling the iris 2 by sending the iris control data obtained in the automatic exposure control mode or in the manual exposure control mode to the lens unit every time communication is made with the lens unit.

Next, the operation of the lens unit is described with reference to the flow chart of FIG. 6(b).

Step L1: A check is made for the input of a chip select signal from the camera unit while waiting for communication. A step L2: Upon receipt of the chip select signal, the iris control data transmitted is taken in by serial-to-parallel conversion. In the event of no input of the chip select signal, the iris data is not renewed and the flow comes to a step L4.

Step L3: Upon receipt of communication from the camera unit, a discrimination is made between selection of the automatic exposure control mode and that of the manual exposure control mode. Step L4: If the automatic exposure control mode is found to have been selected, the iris 2 is controlled by supplying the iris control data to the D/A converter 26. Step L5: In the event of selection of the manual exposure control mode, a check is made to find if the manual mode is set immediately before. If so, the following steps L6 and L7 are executed.

Step L6: A driving action on the iris 2 is brought to a stop. Step L7: The current aperture value data of the encoder 14 (for example, a Hall element) which is arranged to detect the aperture value of the iris is taken in. The value thus obtained is held within the lens microcomputer 24. Step L8: With the manual exposure control mode selected, the correction data received from the camera unit is added to the aperture value held within the lens microcomputer. The result of addition is stored as new held data. Step L9: The aperture value data which is currently obtained by the encoder or a Hall element 14 and is A/D converted by the A/D converter 27 is taken into the lens microcomputer 24.

Step L10: The aperture value data from the encoder (Hall element) 14 is compared with the held data to see if they are equal to each other. Step L11: A check is made to find if the data held within the lens microcomputer 24 is larger than the aperture value data obtained from the encoder (Hall element) 14. Step L12: If the data from the encoder (Hall element) is found to be equal to the held data at the step L10, the iris driving action is brought to a stop and the flow comes back to the step L1. Step L13: If the held data is found to be larger than the data from the encoder (Hall element) at the step L11, the iris 2 is driven in the direction of opening it and the flow comes back to the step L1. Step L14: If the data from the encoder (Hall element) is found to be larger than the held data, the iris is driven in the direction of closing it and the flow comes back to the step L1.

The above-stated flow of operation is repeated to control the iris 2 by renewing the control data every time communication is made with the camera unit CM.

In the case of the second embodiment described, the invention is applied to the camera of a camera-integrated type VTR of the kind using an interchangeable lens. However, it goes without saying that the arrangement described likewise applies to a camera-integrated type VTR not using an interchangeable lens. In such a case, the operation can be adequately carried out by just omitting the steps C1 to C4 of FIG. 6(a) and the steps L1 and L2 of FIG. 6(b).

Further, in the second embodiment, the aperture value is arranged to be held and retained at the time of change-over from the automatic exposure control mode to the manual exposure control mode. However, the same arrangement also applies to a case where the aperture value is arranged to be held when the manual control mode is changed over to the automatic control mode. The invented arrangement is applicable to a wide range of methods for change-over from one exposure control mode over to a different mode in general.

As mentioned above, in carrying out change-over from the automatic exposure control mode to the manual exposure control mode or change-over between a plurality of different exposure modes in general, the automatic exposure control device according to this invention is arranged to hold and retain information on the aperture value of the iris obtained immediately before the change-over and the aperture value thus held is used as an initial value and adjusted in the new exposure control mode. Therefore, one exposure control mode can be smoothly changed over to another and the exposure correction can be easily accomplished. The exposure state obtained before the exposure control mode change-over is prevented from incontinuously and abruptly changing at the time of change-over. This effectively prevents any disagreeable and unnatural picture from being caused by an abrupt change of exposure.

With reference to the accompanying drawings, the following describes automatic exposure control devices which are arranged according to this invention to solve the second problem of the prior art described in the foregoing.

Figure 7:
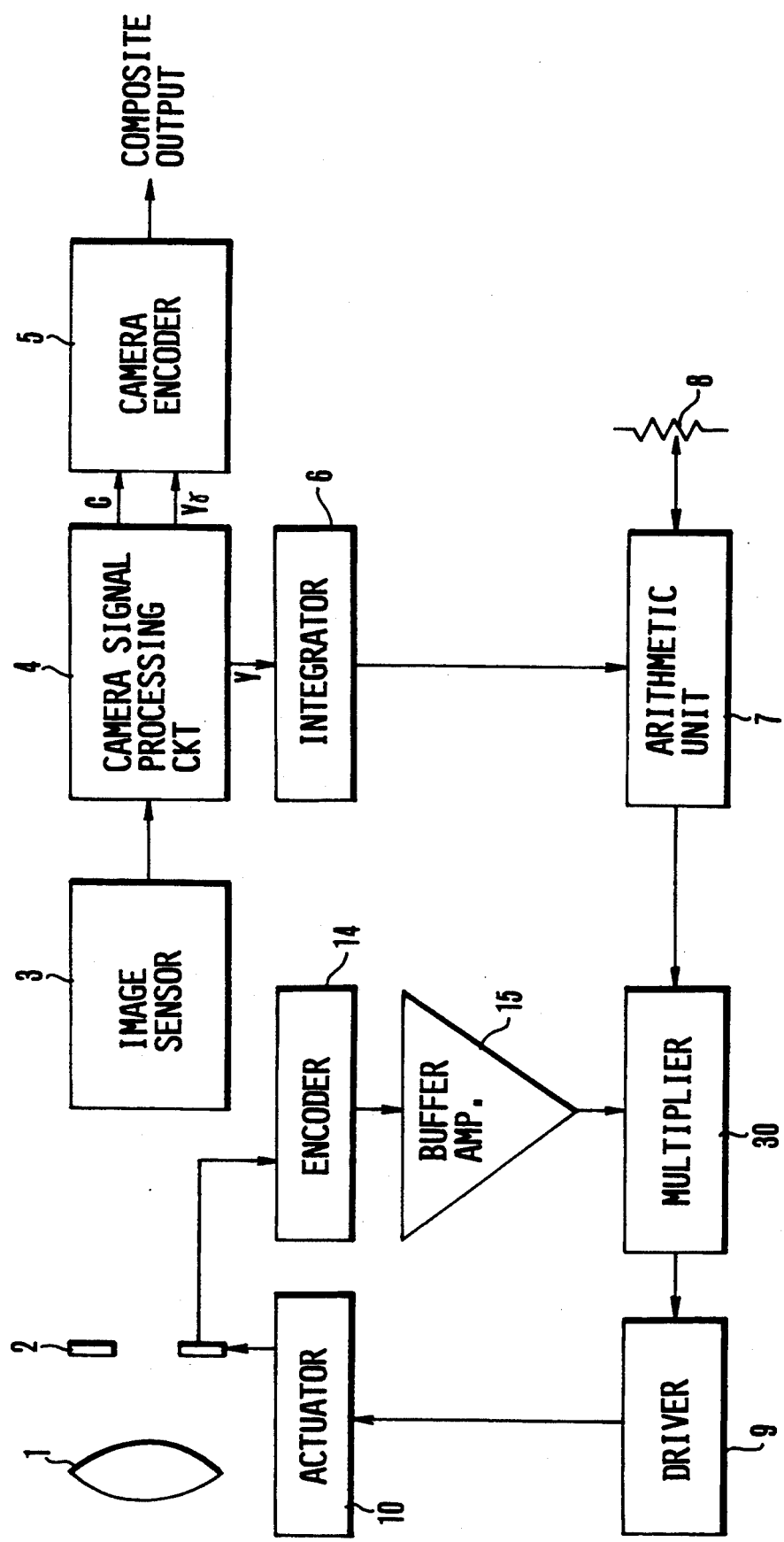
FIG. 7 is a block diagram showing the arrangement of a third embodiment of this invention.

FIG. 7 shows in a block diagram an automatic exposure control device arranged as a third embodiment of the invention. In FIG. 7, parts arranged in the same manner as those of the first and second embodiments described in the foregoing are indicated by the same reference numerals and the details of them are omitted from the following description. An object's image is formed on the image plane of an image sensor 3 which is a CCD or the like by a light flux coming via the lens optical system 1 and an iris 2. The image is photo-electrically converted by the image sensor 3 into an image signal. The image signal is supplied to a camera signal processing circuit 4. The circuit 4 then processes the image signal including a gamma correction process, etc., and, as a result, produces a chrominance signal C and a luminance signal Yγ as a video signal. These signals are applied to a camera encoder 5 to be converted into a TV signal conforming to, for example, the NTSC system. The output of the encoder 5 is then produced from a camera part in the form of a composite video signal.

Meanwhile, another luminance signal Y which is output also from the camera signal processing circuit 4 is supplied to an integrator 6 for the purpose of obtaining a control signal to be used in controlling an iris 2 for an exposure apposite to the luminance state of the image plane. The luminance signal is integrated by the integrator 6. The integrated signal is supplied to an arithmetic unit 7 to be compared with a reference value 8. As a result, the arithmetic unit 7 produces a difference signal. The difference signal is supplied as an exposure (iris) control signal to an actuator 10 via a driver 9. Then, the iris 2 is controlled on the basis of the difference signal in such a way as to make this signal unvarying.

The aperture position or value of the iris 2 is detected by an iris encoder 14. The detected aperture value is supplied to a buffer amplifier 15 to be amplified up to a given level. The output of the buffer amplifier 15 is supplied to a multiplier 30 to be used in correcting the iris control signal coming from the arithmetic unit 7. The iris encoder 14, the buffer amplifier 15 and the multiplier 30 jointly form an inverse correction circuit for inversely correcting a change occurred in the feedback loop gain of an iris control system, which represents a feature of this invention.

Figure 8:
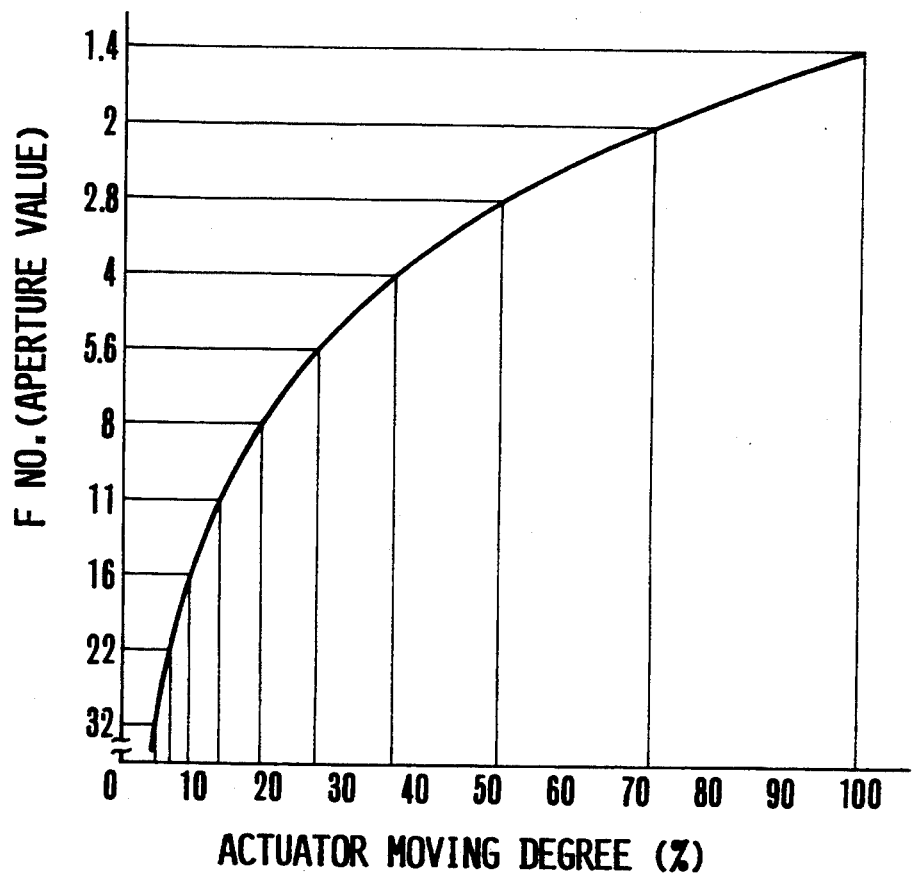
FIG. 8 shows the characteristic of an iris employed in the third embodiment of the invention.
Figure 9:
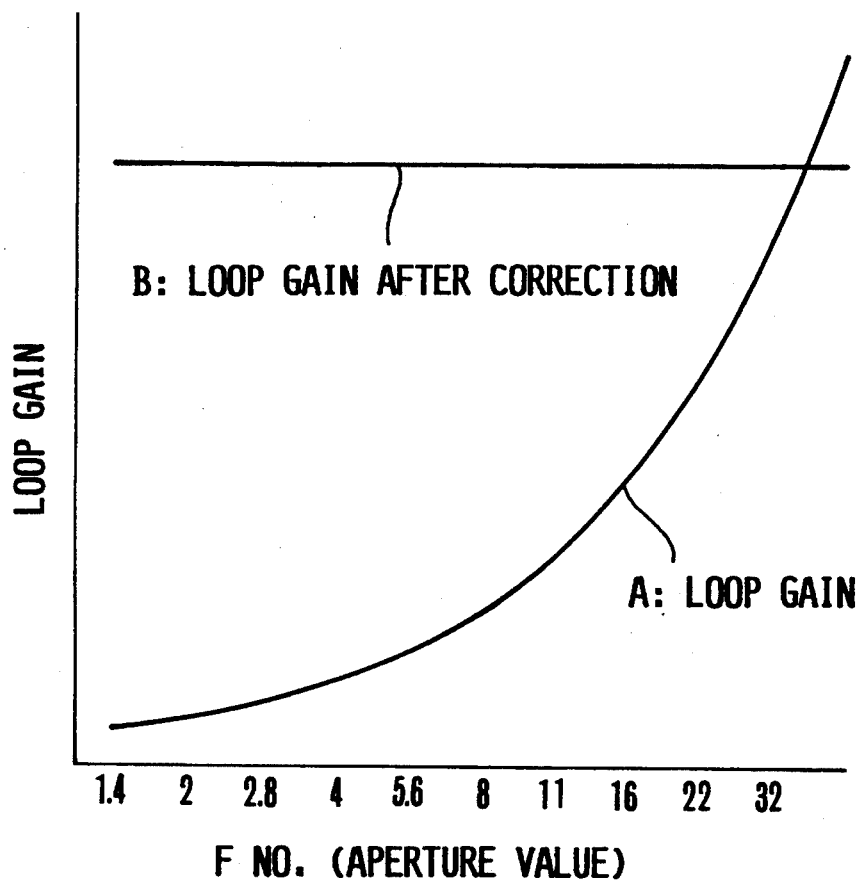
FIG. 9 shows the characteristic of an iris control system of the third embodiment.

A general optical characteristic of the iris 2 is as follows: as shown in FIG. 8, the moving degree of the iris driving actuator is in a non-linear relation to the aperture value of the iris. The characteristic is such that the aperture value comes to change to a greater degree even for a slight moving degree of the actuator accordingly as the iris position is shifted to a smaller aperture position. Further, on the side of the smaller aperture values, the greater change of the aperture value in relation to the moving degree tends to bring about hunting. In FIG. 9, a characteristic curve A shows the loop gain of the iris controlling feedback loop as in relation to the aperture value.

Assuming that the iris of the embodiment of the invention has the optical characteristic as shown in FIG. 8, the correction circuit which controls the gain of the iris control system is arranged based on the above-stated premise to operate as described below:

A voltage output from the encoder 14 which is arranged to detect the aperture value of the iris 2 is supplied to and amplified by the buffer amplifier 15 at a given rate and is biased to a given degree. After that, the output of the amplifier 15 is applied to the multiplier 30. The multiplier 30 obtains the product of a difference signal from the reference value 8 produced by the arithmetic unit 7 and the voltage which represents an aperture value and is output from the buffer amplifier 15. As mentioned in the foregoing, the quantity of light varies to a great degree even for a slight change of the iris occurred on the side of its small aperture positions. The loop gain of the control system thus becomes high on the small aperture side. In view of this, the buffer amplifier 15 is arranged such that the output voltage of the amplifier 15 is high when the iris is near its full open position and decreases accordingly as the iris is closed. The output voltage of the buffer amplifier 15 thus changes with the aperture value.

Figure 10:
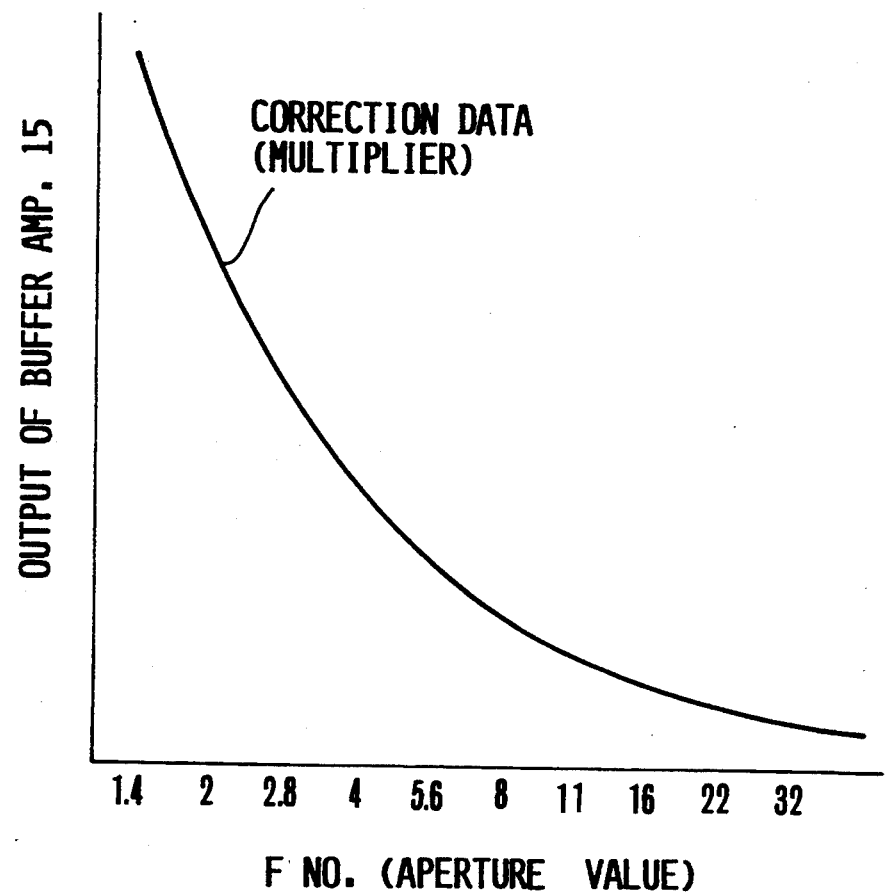
FIG. 10 shows the characteristic of an iris correction system of the third embodiment.

Since the output of the buffer amplifier 15 which is arranged in this manner is multiplied by the moving degree of the actuator 10 which is arranged to drive the iris, the moving degree of the actuator 10 decreases accordingly as the iris aperture is stopped down toward the small aperture side where the quantity of incident light varies to a greater degree even for a slight moving degree. This prevents hunting. FIG. 10 shows the output voltage of the buffer amplifier 15 (corresponding to a correction value for the moving degree of the actuator 10) in relation to the aperture value.

In other words, for the same degree of change in the light quantity, the voltage applied to the driver 9 varies with the aperture value of the iris 2. When the iris 2 is in a full open state, the output voltage of the buffer amplifier 15 is large; and, since the change of this voltage is amplified by the multiplier 30, the iris is shifted to a greater degree. The output voltage of the buffer amplifier 15 decreases accordingly as the iris 2 is stopped down. Then, with this voltage multiplied by the output of the arithmetic unit 7 at the multiplier 30, the amplification factor substantially decreases. As a result, the acting degree of the actuator 10 is adjusted to become smaller accordingly.

Figure 11:
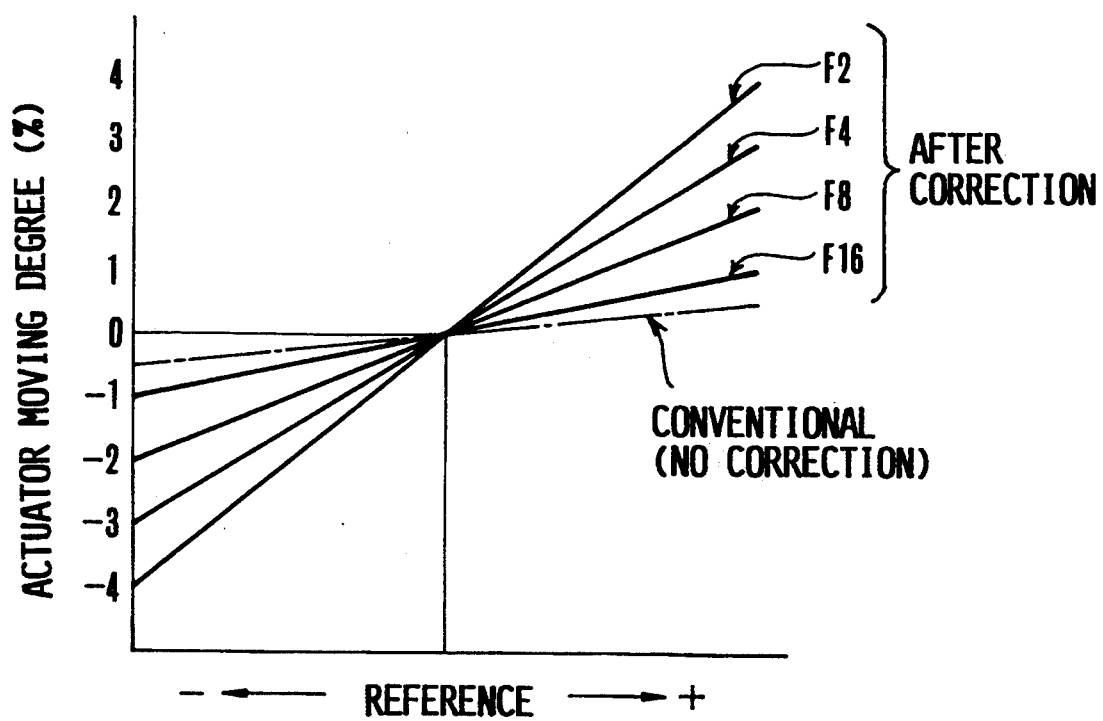
FIG. 11 shows the control voltage of an arithmetic unit of the third embodiment in relation to the moving degree of an iris control actuator.

This control operation is further described with reference to FIG. 11. FIG. 11 shows the iris control output voltage of the arithmetic unit 7 as in relation to the actual moving degree of the actuator 10 with the aperture value of the iris 2 used as a parameter. In FIG. 11, the output voltage of the arithmetic unit 7 which corresponds to the reference value 8 and the moving degree of the actuator 10 obtained at that time are respectively used as standard values. Increases from these standard values are shown in positive values and decreases in negative values.

In the case of the conventional iris control system which is provided with no correction system, the output voltage of the arithmetic unit 7 and the moving degree of the actuator are in a relation which remains unchanged irrespective of changes in the aperture value. This characteristic of the conventional control system is indicated by a one-dot-chain line in FIG. 11. In order to ensure a stable operation without any hunting, the characteristic of the conventional system must be arranged to have a less slanting characteristic curve. As a result, the response speed of the conventional system decreases in the neighborhood of the maximum (or full open) aperture value of the iris.

Whereas, in accordance with this invention, the above-stated gain correction is applied to the output of the arithmetic unit 7 according to changes in the aperture value. The gain correction causes the relation between the output of the arithmetic unit 7 and the moving degree of the actuator to change according to the aperture value. More specifically, the gain is lowered to lessen the inclination of the characteristic curve of the iris control system and to lessen the moving degree of the actuator for a change in the output of the arithmetic unit 7 when the iris is on its small aperture side. This ensures stable iris control without the fear of occurrence of hunting when the iris is on the side of small aperture values.

Further, the gain is corrected to increase accordingly as the aperture value of the iris is shifted toward the maximum value. This increases the inclination of the characteristic curve. The actuator 10 then comes to move to a greater degree relative to the change of the output of the arithmetic unit 7. In other words, the responsivity of the iris action is increased by increasing the loop gain when the iris is on the side of larger aperture values where the sensitivity of it decreases. Further, for the sake of illustration, both the output of the arithmetic unit 7 and the moving degree of the actuator 10 are shown in characteristic curves as having linearity within a slight varying range of driving characteristics.

The iris 2 is thus controlled to move, for the same degree of change in the light quantity, to a greater degree when it is in a wide open position and to a less degree accordingly as it is closed. As a result, the loop gain of the iris control feedback loop becomes almost constant and unvarying as represented by a curve B in FIG. 9. The output of the iris encoder 10 obtained over the whole variable range of aperture becomes smaller accordingly as the iris is driven toward smaller aperture value positions as shown in FIG. 10.

In the feedback loop arranged to control the iris on the basis of changes in the level of the image signal obtained by the image sensor 3 by photo-electric converting the incident light the quantity of which is controlled through the iris, the apparent loop gain for the aperture value can be kept unvarying by reversely correcting changes occurring in the loop gain relative to the aperture value. This ensures smooth iris control irrespective of the aperture value. Besides, the iris control can be stably carried out with no hunting.

A fourth embodiment of the invention is described below with reference to FIG. 12.

In this case, the invention is applied to a video camera or the like which is arranged to use an interchangeable lens. In FIG. 12, parts arranged in the same manner as those of the drawings referred to in the foregoing are indicated by the same reference numerals and the details of them are omitted from description.

The video camera consists of a lens unit LS and a camera unit CM which are coupled by a mount part MT. The mount part MT is provided with a data communication line 29 for exchange of data between the camera and lens units by means of electric contacts which are not shown. Since the camera unit CM is arranged to handle a TV signal, the communication between the camera unit CM and the lens unit LS is arranged to be conducted in synchronism with a vertical sync signal Vsync.

The camera unit CM includes an image sensor 3; a camera signal processing circuit 4; a camera encoder 5; and an integrator 6. They are arranged in the same manner as in the case of the third embodiment shown in FIG. 7. In the fourth embodiment, the output of an integrator 6 is supplied after it is converted into digital data by an A/D converter 25 to a microcomputer 31 (hereinafter referred to as camera microcomputer) which controls the camera unit CM. A reference value 8 is also supplied to the camera microcomputer 31 through an A/D converter 28.

The lens unit LS is arranged as follows: a microcomputer 32 (hereinafter referred to as lens microcomputer) is arranged within the lens unit to control the lens unit. Iris control data is computed by the lens microcomputer 32 on the basis of control data sent from the camera microcomputer 31 via the communication line 29. The iris control data is supplied to a driver 9 via a D/A converter 26. An iris 2 is controlled according to this data. An iris encoder 14 detects the aperture value of the iris and produces correction data according to the aperture value detected. The correction data is supplied to a buffer amplifier 15. The output of the buffer amplifier 15 is also supplied to the lens microcomputer 32 after it is converted into digital data by an A/D converter 27. Then, the lens microcomputer 32 performs a computing process to correct the above-stated loop gain.

In the case of the fourth embodiment, the function of the correction circuit of the third embodiment which consists of the buffer amplifier 15 and the multiplier 30 of FIG. 7 is included in the lens microcomputer 32 and a part of it is included in the camera microcomputer 31. In the case of the third embodiment, the control signal is amplified by the multiplier 30 at a given amplification factor which is set by adjusting the bias and amplifying rates. Whereas, the fourth embodiment is arranged as follows: The multiplier 30 is not used. The image signal, the reference signal and the encoder output signal are supplied respectively to the camera and lens microcomputers 31 and 32 after they are converted into digital data through the A/D converters 25, 28 and 27. Then, these digital data are computed and processed within the camera and lens microcomputers respectively. The fourth embodiment is not only capable of linearly carrying out the computing process, in the same manner as in the case of the third embodiment, but also capable of making inverse correction in cases where the iris 2, the driver 9, the actuator 10, the iris encoder 14, the buffer amplifier 15, etc., have non-linear characteristics.

Figure 12:
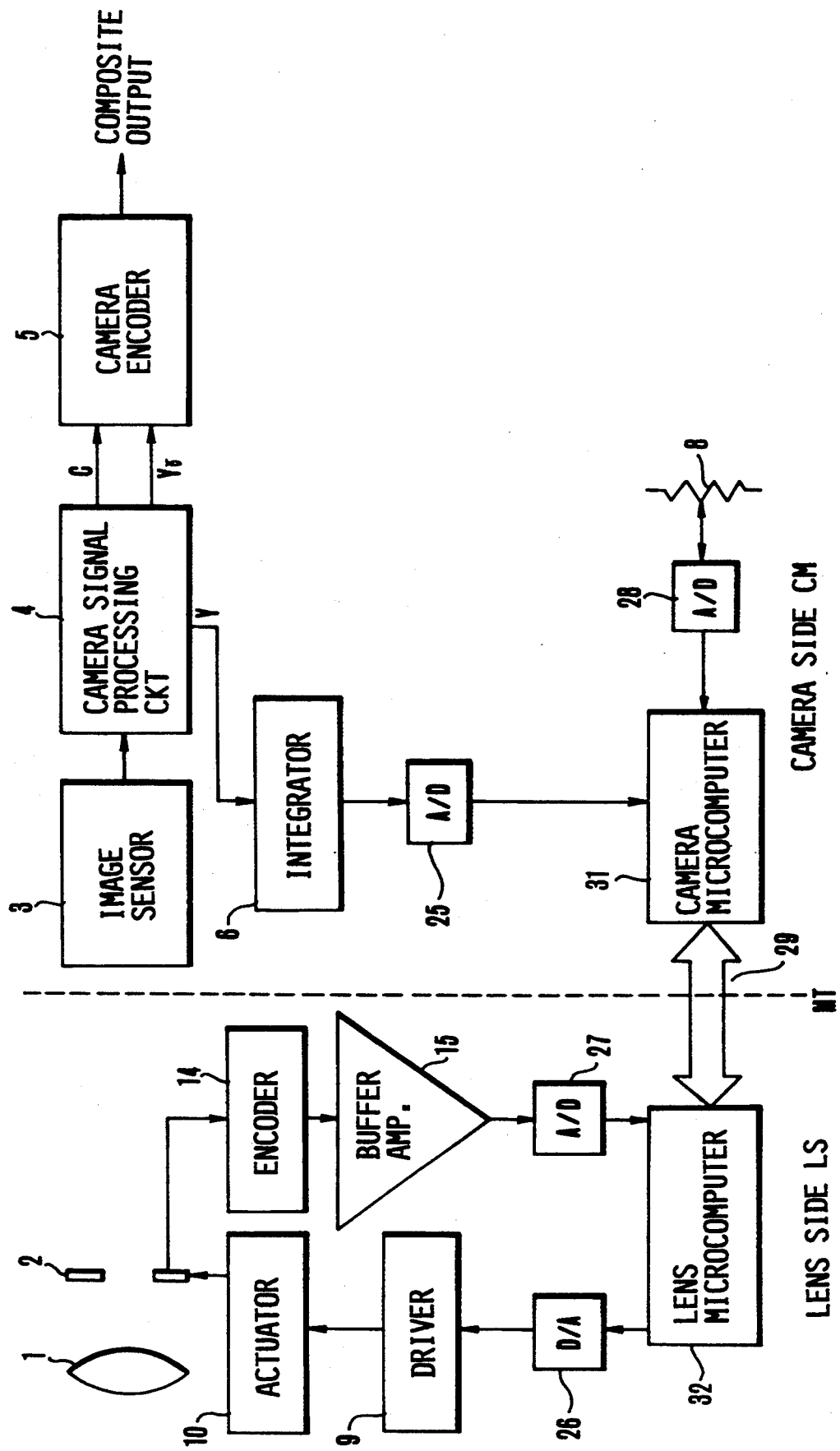
FIG. 12 is a block diagram showing the arrangement of a fourth embodiment of the invention.

The details of the fourth embodiment shown in FIG. 12 are as follows: the video (or image) signal which is obtained from the integrator 6, like in the case of the third embodiment, is converted into a digital signal by the A/D converter 25, the digital signal thus obtained is supplied to the camera microcomputer 31. The camera microcomputer 31 also takes therein the reference voltage 8 which has been converted into digital data by the A/D converter 25. The microcomputer 31 then performs a computing operation on these inputs in the same manner as in the case of the third embodiment.

The result of computation by the camera microcomputer 31 is sent to the lens microcomputer 32 through a predetermined procedure via the communication line 29.

The lens microcomputer 32 processes the iris control data received from the camera microcomputer 31 at a given amplification factor determined by iris aperture information which is obtained from the output of the iris aperture value encoder 14, amplified at the given amplification factor through the buffer amplifier 15 and converted into digital data by the A/D converter 27. The iris control data which is thus set at the given amplification factor is supplied to the D/A converter 26.

The amplification factor does not have to be linearly related to the aperture value of the iris as mentioned in the foregoing. For example, the aperture values may be divided into areas and the amplification may be made by a gain suitable for each aperture value. The number of divided areas and the gain values are suitably selected according to the characteristics of the iris and the encoder in use. The data thus selected may be stored within the lens microcomputer 32 in the form of a data table.

With the exception of the arrangement described above, the rest of the arrangement of the fourth embodiment is identical with the third embodiment.

Figure 14A:
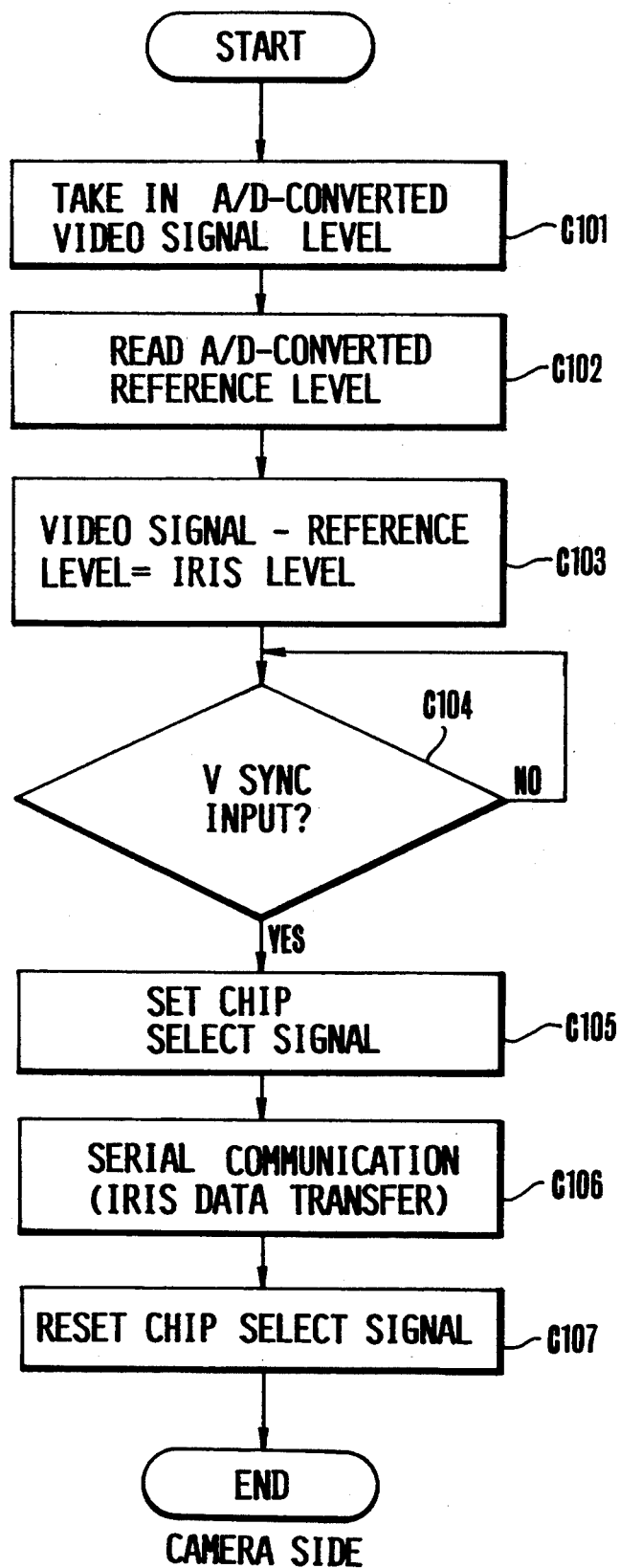
FIGS. 14(a) and 14(b) are flow charts showing the operation of the fourth embodiment.
Figure 14B:
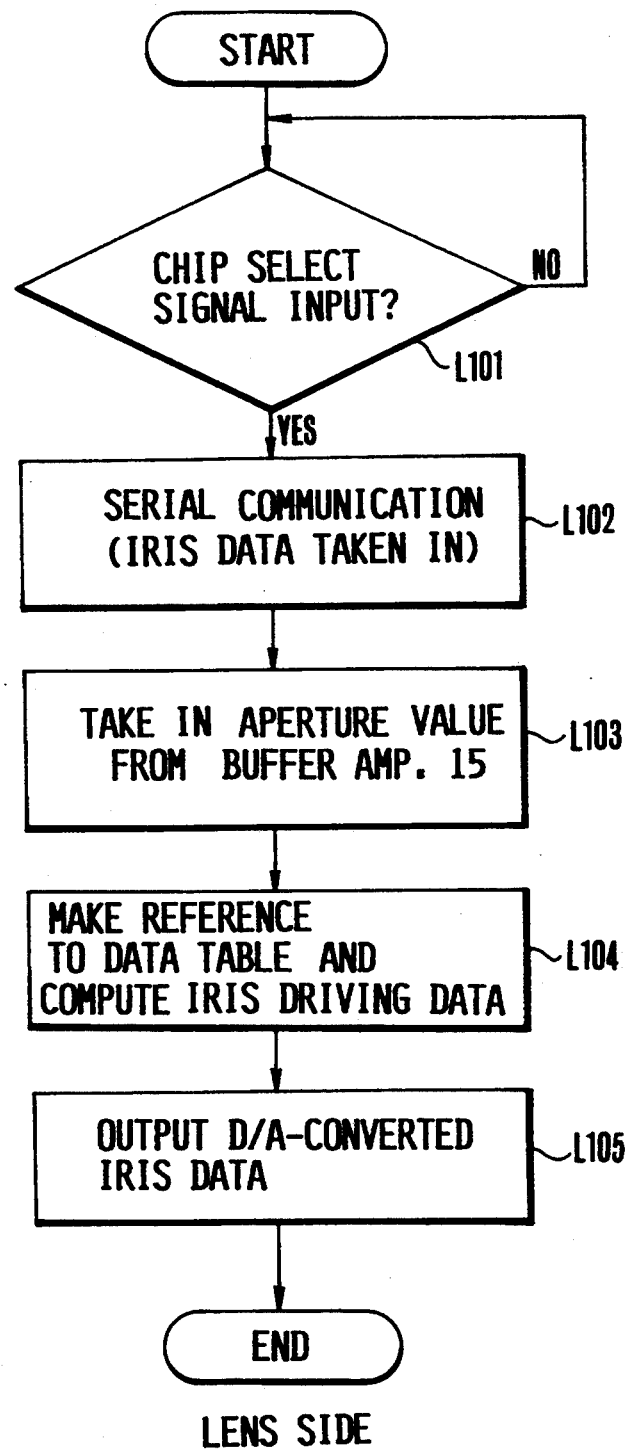

FIGS. 14(a) and 14(b) show in flow charts the operation of the camera unit (side) and that of the lens unit (side) of the fourth embodiment shown in FIG. 12. The operation performed on the side of the camera unit is first described with reference to FIG. 14(a) as follows:

Step C101: A luminance signal which is output from the camera signal processing circuit 4 and is integrated by the integrator 6 is converted into a digital signal by the A/D converter 25. The digital signal thus obtained is taken into the camera microcomputer 31. Step C102: A reference level signal which is converted by the A/D converter 28 into a digital signal is also taken into the camera microcomputer 31. Step C103: The camera microcomputer 31 computes "the integrated value of the video signal—the reference level". Step C104: The flow of operation waits for the input of a given number-th vertical sync signal Vsync of the video signal. Step C105: A chip select signal is set. Step C106: The iris control data is parallel-to-serial converted and is sent from the camera side to the lens side via the communication line 29. Step S107: The chip select signal is reset.

The transmission of one packet of iris control data to the lens side comes to an end at the step C107. This transmission is repeated in a cycle.

Next, referring to FIG. 14(b), the lens unit LS performs a processing operation in the following manner on the basis the data transmitted from the camera side:

Step L101: A check is made for the input of the chip select signal. Step L102: The iris control data is taken into the lens microcomputer 32 by a serial-to-parallel conversion process. Step L103: At the same time, the aperture value data detected by the iris encoder 14 is amplified up to a given level and, after that, the data is converted into digital data by the A/D converter 27. The digital aperture value data thus obtained is taken into the lens microcomputer 32. Step L104: The lens microcomputer 32 collates the transmitted aperture value data with a conversion table arranged beforehand within the lens microcomputer 32. Iris driving data is obtained by this. At the same time, a correction value is obtained by checking the iris correcting data supplied from the A/D converter 27 with the aperture-value and gain correction table shown in FIG. 13. Then, iris driving data is corrected on the basis of the correction value thus obtained. Step L105: The iris driving data which is thus corrected is supplied to the D/A converter 26.

The control data communication is made between the camera unit and the lens unit with the above stated flow of control operation repeated in a given cycle. By this, the iris control and other control are executed.

On the side of the lens unit, as mentioned in the foregoing, the output of the encoder 14 which detects the aperture value of the iris is supplied via the buffer amplifier 15 and the A/D converter 27 to the lens microcomputer 32. Then, in the same manner as in the case of the third embodiment described in the foregoing, the loop gain of the iris control feedback loop is corrected. With the exception that the process is performed within the microcomputer, the control operation is accomplished in the same manner as in the case of the third embodiment.

Figures 13, 16:
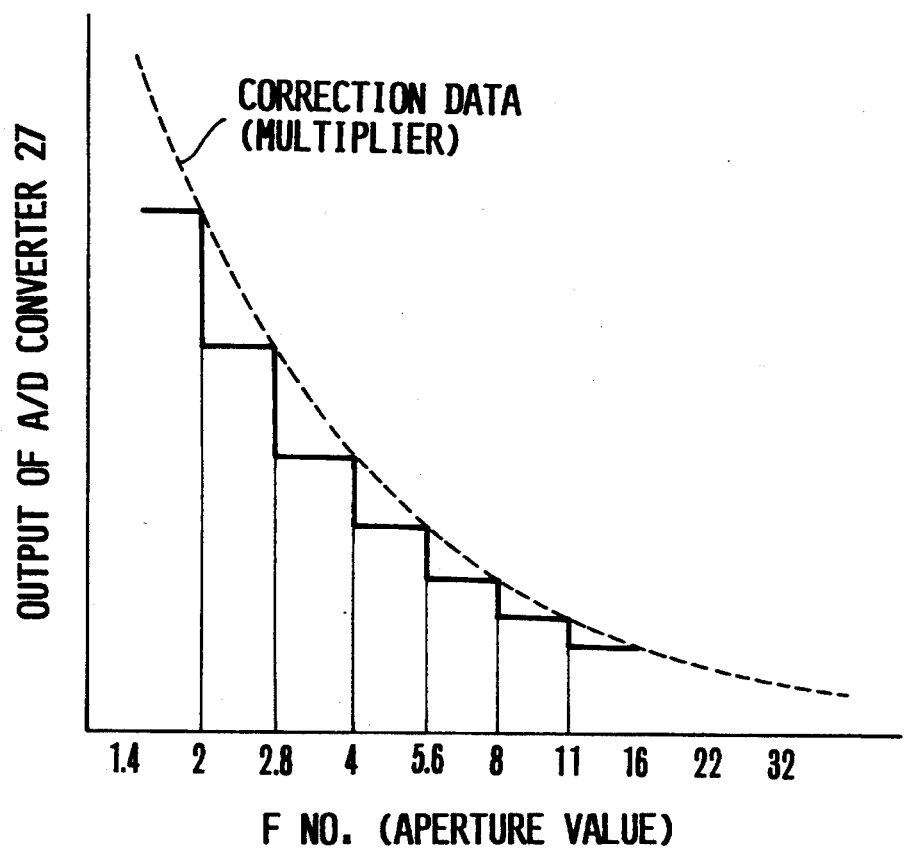
FIG. 13 shows a data table to be used for iris control by the fourth embodiment.
FIG. 16 shows the characteristic of an iris correction system of the embodiment of the invention.
Figure 15:
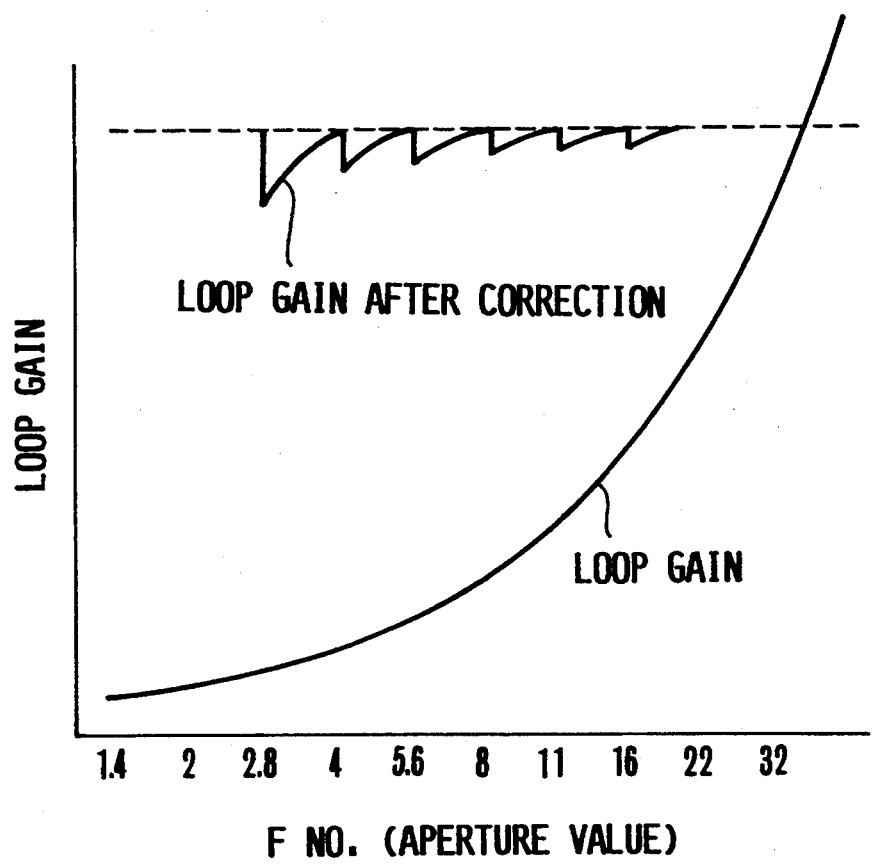
FIG. 15 shows the characteristic of an iris control system of the embodiment of this invention.

FIG. 15 shows in characteristic curves the relation of the aperture value to the above-stated loop gain obtained before and after the correction of the iris control loop. FIG. 16 shows a characteristic curve representing a relation obtained between the aperture value and the output of the buffer amplifier 15 (the output of the A/D converter 27 which corresponds to the correction value for the actuator 10) with the iris control performed by using the data table of the lens microcomputer 32. As apparent from this illustration, the moving degree of the actuator and the loop gain correction is controlled separately for each aperture value unlike in the case of the analog control performed by the third embodiment (see FIGS. 9 and 10).

This (fourth) embodiment is arranged to have the data table provided within-the lens microcomputer for iris control and correction. This is a highly advantageous feature in terms of interchangeability, because it enables each interchangeable lens to provide complete control data apposite to the characteristic of the iris thereof.

In controlling the exposure of a video camera, etc., the correction system of the inverse characteristic of the exposure control device which is arranged according to this invention corrects the non-linearity of the control system resulting from its loop gain of aperture value according to the characteristics of the iris, the iris driving actuator and the aperture value detecting encoder. This enables the embodiment to have a substantially unvarying loop gain with the iris driving characteristic saliently varied according to the aperture value without impairing its operability. The hunting that tends to take place on the small aperture side of the iris can be prevented for smooth and stable iris aperture control.

It is another advantage that a correction characteristic for the aperture control system is programmed beforehand in the form of a table within the microcomputer to ensure smooth aperture control. In cases where an interchangeable lens is used as in the case of the fourth embodiment described, the control and correction data can be prepared and stored on the side of the lens unit in accordance with the characteristic of the iris-lens optical system of the lens unit. This is a great advantage in terms of the interchangeability of the lens.

Figure 1:
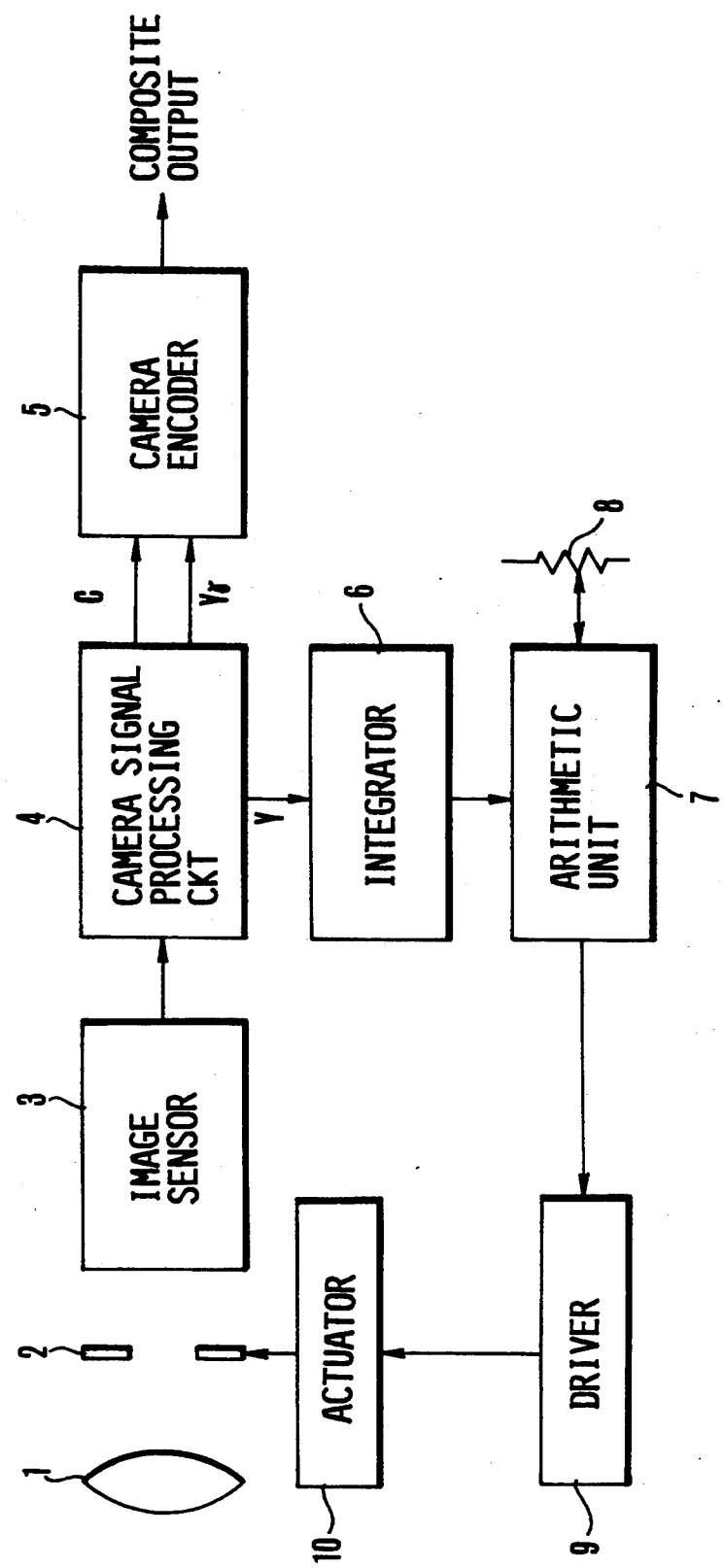
FIGS. 1 and 2 are block diagrams showing the conventional aperture control systems.
Figure 2:
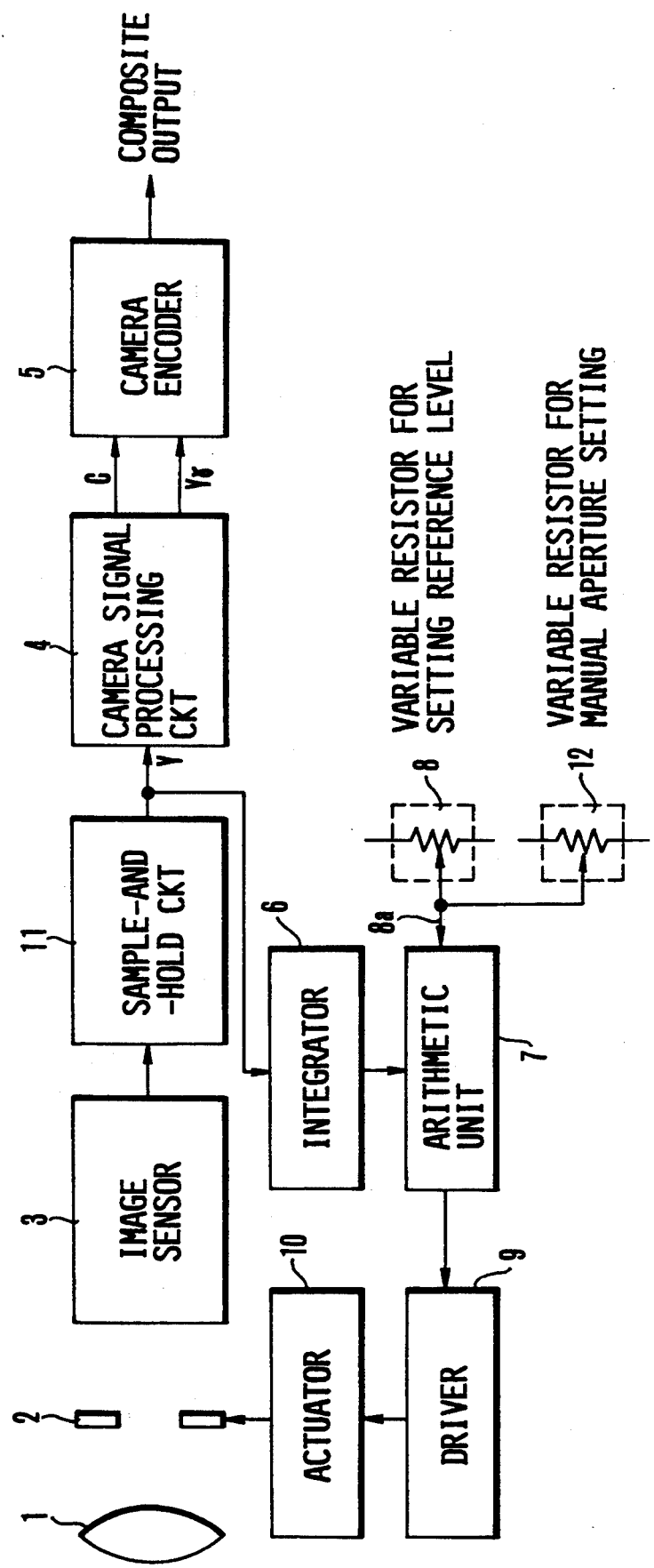
Figure 17:
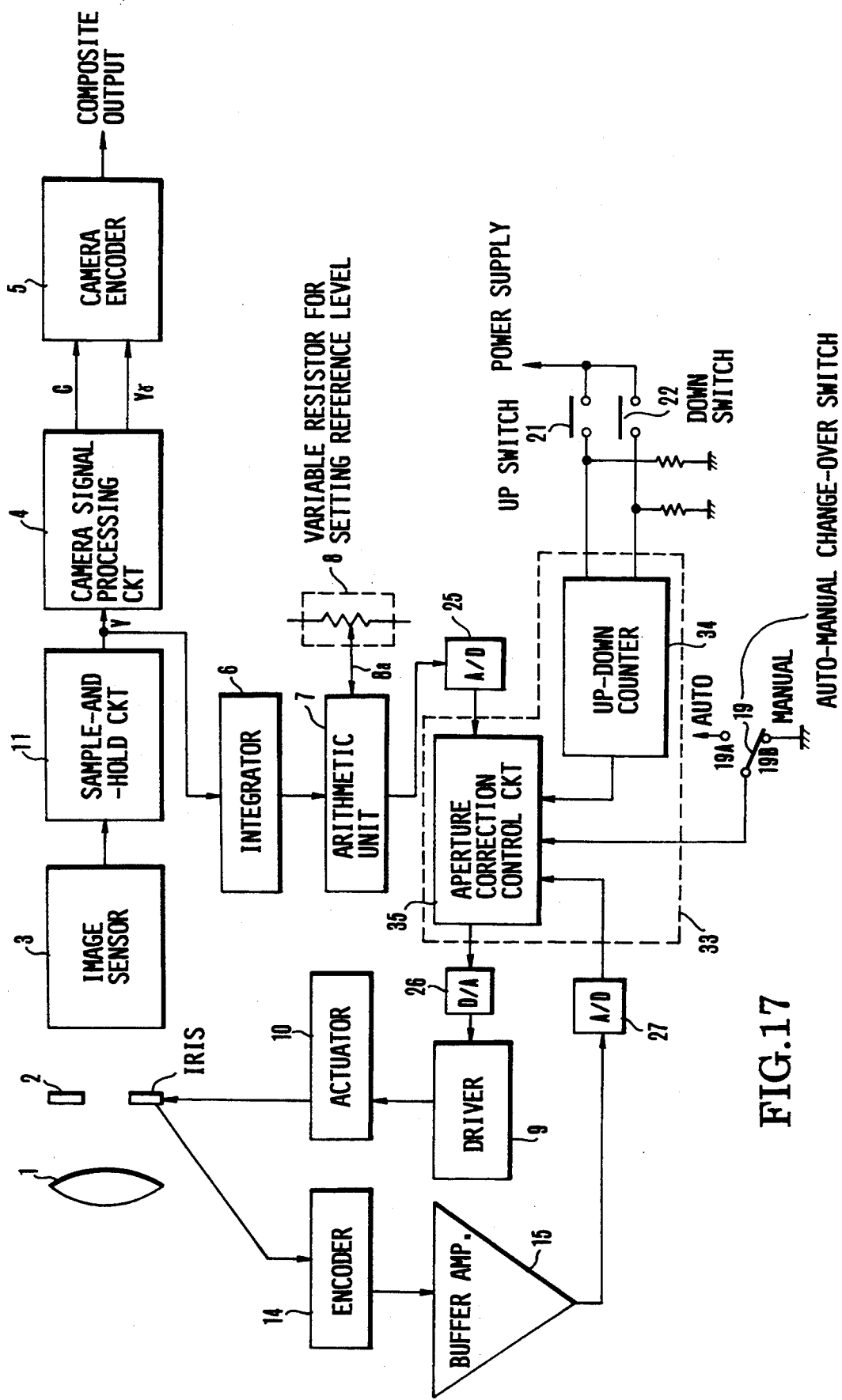
FIG. 17 is a block diagram showing the arrangement of a fifth embodiment of the invention.

In order to solve the third problem mentioned in the foregoing description of the conventional device shown in FIG. 2, an automatic exposure control device is arranged according to this invention as described below:

FIG. 17 shows in a block diagram the automatic exposure control device arranged as a fifth embodiment of the invention. In FIG. 17, the parts arranged in the same manner as those of the conventional device and the preceding embodiments described in the foregoing are indicated by the same reference numerals and the details of them are omitted from the following description. In the case of this (fifth) embodiment, the characteristic of the iris (or aperture) control system is corrected not only in the automatic mode but also in the manual iris control mode, so that a certain manual-operation feeling can be obtained irrespective of the aperture value positions of the iris.

To distinguish the object of the fifth embodiment, the embodiment is compared with the conventional device of FIG. 2 as follows: the embodiment differs in that, after the output of the arithmetic unit 7 is converted into a digital signal by the A/D converter 25, the digital signal is supplied to an aperture correction control circuit 35 which is arranged to correct the above-stated change taking place in the loop gain of the iris control feedback loop according to the aperture value. The loop gain change is corrected in such a way as to make the changing degree of the aperture relative to the degree of operation unvarying. At the aperture correction control circuit 35, the iris control value is gain-corrected in accordance with data which is obtained by digitizing, through the A/D converter 27, the aperture detection value of the iris encoder 14 output from the buffer amplifier 15. The gain-corrected aperture control value is supplied via the D/A converter 26 to the iris driving driver 9.

In the manual exposure control mode, the iris control data is set by an up-down counter 34, in conjunction with the aperture-value-setting up or down switch 21 or 22, by the number of times for which the switch is pushed or by the length of time for which the switch is pushed. The data which is set in this manner is supplied in a digital form to the iris control feedback loop from the aperture correction control circuit 35.

Further, the embodiment is provided with an aperture adjustment mode selection switch 19 for selection between an automatic mode in which the iris aperture is automatically controlled according to the quantity of light incident on the image sensor 3 and a manual mode in which the iris aperture is manually set by means of the aperture value setting switches 21 and 22.

The aperture correction control circuit 35 and the up-down counter 34 for setting an aperture value are arranged within a microcomputer 33.

The fifth embodiment of the invention which is arranged as described above operates as follows: a lens optical system 1 forms, through the iris 2, an object's image on the image plane of the image sensor 3 which is a CCD or the like. The image is photo-electrically converted by the image sensor 3 and is output as an image signal. The image signal is supplied via a sample-and-hold circuit 11 to a camera signal processing circuit 4. The circuit 4 performs various processes including a gamma correction process and produces a chrominance signal C and a luminance signal Yγ. These outputs of the circuit 4 are converted into a TV signal form conforming to the NTSC system or the like by a camera encoder 5. The output of the encoder 5 is produced from the camera in the form of a composite video signal or the like.

Meanwhile, to obtain a control signal for controlling the iris 2 to ensure an exposure apposite to the luminance state of the image plane, a luminance signal Y which is output from the sample-and-hold circuit 11 is supplied to and integrated by an integrator 6. The output of the integrator 6 is supplied to the arithmetic unit 7 to be compared with a set reference value 8a obtained by a reference value setting variable resistor 8. As a result, a difference signal is generated. This difference signal is converted into a digital signal by the A/D converter 25. The digital signal thus obtained is supplied as an exposure control signal to the aperture correction control circuit 35. The circuit 35 performs a correcting action on the control signal in a manner as will be described later. The corrected control signal thus output from the circuit 35 is supplied to an iris driving actuator 10 via a driver 9. The iris 2 is thus controlled according to this control signal in such a way as to make the above-stated difference signal unvarying.

The encoder 14 detects the opening degree (aperture position or value) of the iris 2. The detected value is amplified up to a given level by a buffer amplifier 15 and is then converted into a digital signal by an A/D converter 27. The digital signal is supplied to the aperture correction control circuit 35 to be used for correcting the aperture (exposure) control signal. The inverse correction circuit for reversely correcting the changes of loop gain of a feedback loop of the aperture control system which represents a feature of this invention is formed jointly by the encoder 14, the buffer amplifier 15 and the aperture correction control circuit 35.

Figure 19:
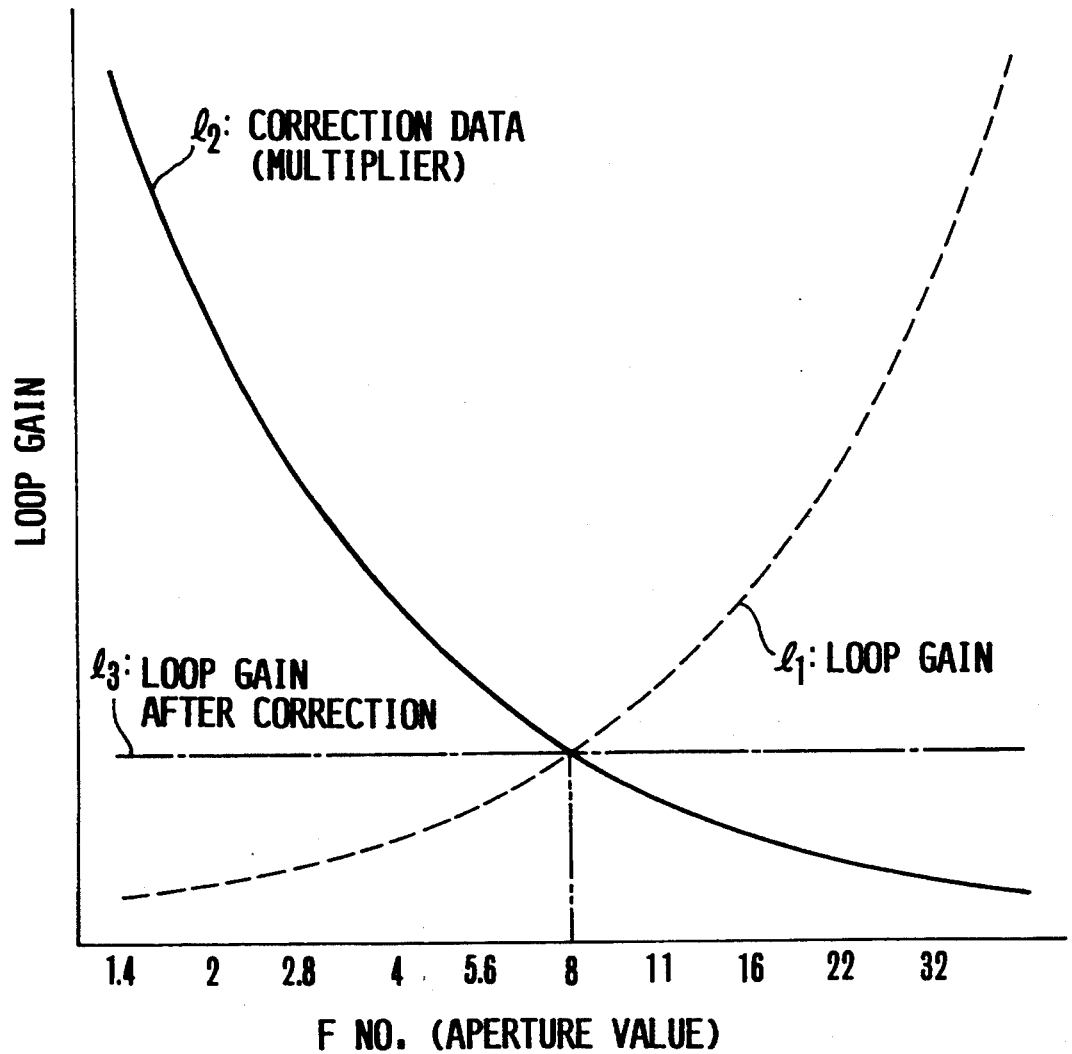
FIG. 19 shows the correction characteristic of an iris control system of the embodiment of the invention.

The generic optical characteristic of the iris 2 is as follows: as shown in FIG. 8, the moving degree of the iris driving actuator is in a non-linear relation to the aperture value. The aperture value comes to be changed to a greater degree by a slight degree of movement of the actuator accordingly as the iris is shifted to a smaller aperture position. In other words, the loop gain of the feedback loop increases when the iris is on the side of its smaller aperture positions. On the smaller aperture side, the actuator moves to a greater degree in response to even a slight change in the quantity of light. Besides, hunting tends to occur on the smaller aperture side as the aperture value changes to a great degree there. In FIG. 19, a curve $l_1$ indicates the relation of the loop gain of the aperture control feedback loop to the aperture value. The characteristic curves of FIGS. 9 and 10 are virtually combined in FIG. 19.

The operation of the above-stated correction circuit which controls the gain of the aperture control system is described below on the assumption that the iris has the optical characteristic as shown in FIG. 8.

The encoder 14 produces a voltage as a result of detection of the opening degree, i.e., aperture value, of the iris. The voltage is supplied to the buffer amplifier 15 to be amplified at a given amplification factor and to be biased to a given degree. The output of the buffer amplifier 15 is converted into a digital signal by the A/D converter 27. The digital signal thus obtained is supplied to the aperture correction control circuit 35. The control circuit 35 receives the output of the arithmetic unit 7 via the A/D converter 25 as well as the digital signal from the A/D converter 27. At the circuit 35, the loop gain indicated by the curve $l_1$ of FIG. 19 is multiplied by an inverse loop gain of a characteristic which is represented by another curve $l_2$ in FIG. 19. As a result, the loop gain is corrected to have a fixed loop gain characteristic which is as represented by a curve $l_3$. The quantity of light varies, as mentioned above, to a great degree even for a slight change in the aperture when the iris is on its small aperture side and, as a result, the loop gain of the control system increases on the small aperture side. In view of this, the aperture correction control circuit 35 is arranged to make correction according to the aperture value in the following manner: the level of the aperture control signal which is output from the D/A converter 26 increases when the iris is in a position near its maximum aperture position and decreases accordingly as the iris aperture is stopped down. The actuator is thus controlled to move to a shorter extent as the iris aperture is stopped down to the smaller aperture value range where the quantity of light changes to a great degree even for a small moving degree of the actuator. This prevents hunting. In other words, for the same degree of change in the light quantity, the voltage applied to the driver 9 varies according to the aperture value of the iris 2. The iris 2 is caused to shift its position to a greater degree as its position comes closer to the maximum aperture position.

Figure 18:
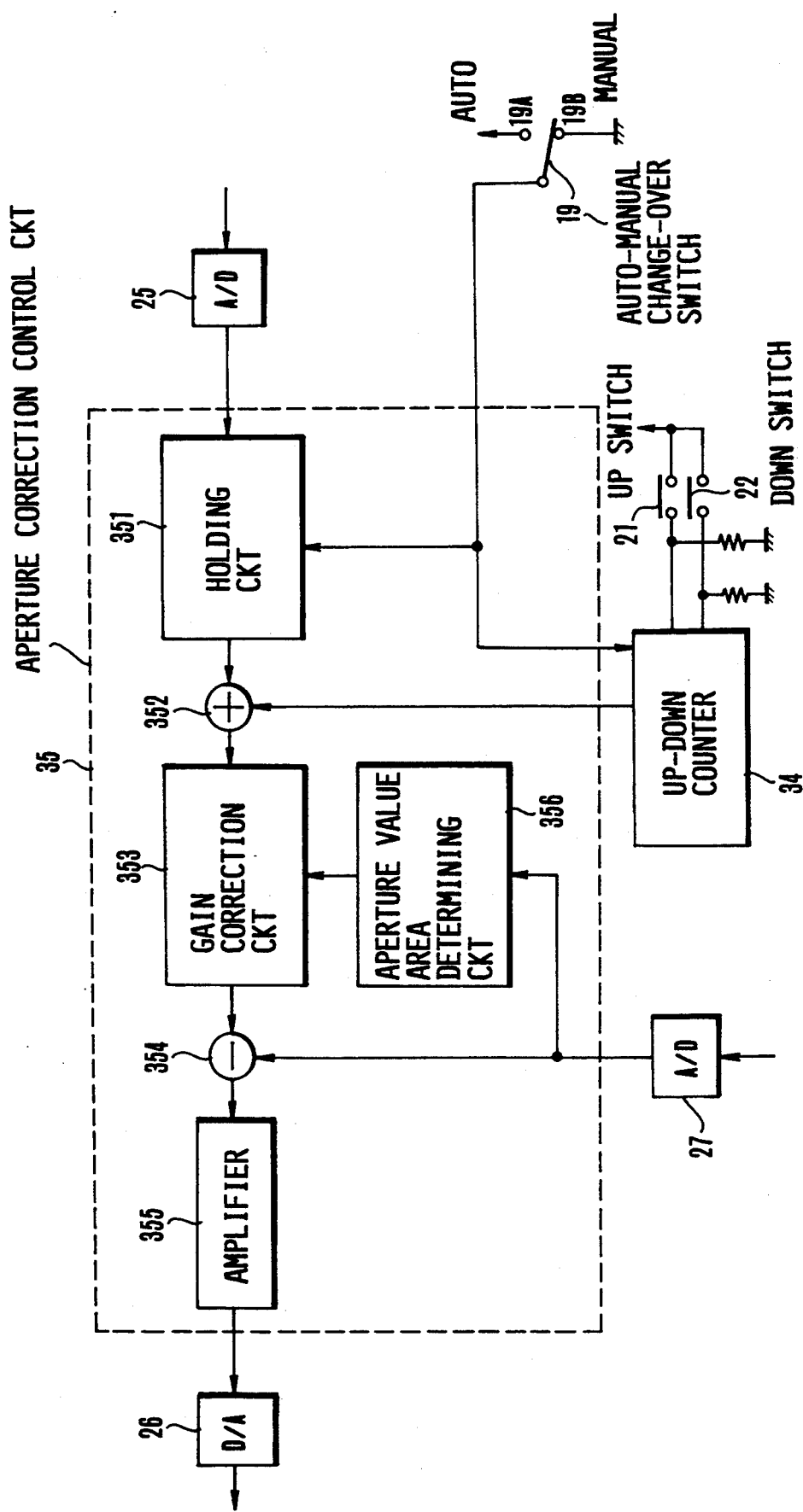
FIG. 18 is a block diagram showing the arrangement of an aperture correction control circuit shown in FIG. 17.

FIG. 18 shows in a block diagram the details of the internal arrangement of the aperture correction control circuit 35. While the aperture correction control circuit 35 is actually formed in a microcomputer, it is shown in a block diagram for the sake of illustration.

An image level signal which comes from the A/D converter 25 is supplied to a holding circuit 351 which keeps the signal level unchanged as an aperture control signal. The holding circuit 351 is arranged to normally allow the output of the A/D converter 25 as it is. In the event of change-over to a manual mode with the position of an automatic-manual change-over switch 19 shifted to one contact 19B thereof, the circuit 351 serves to keep and hold the output of the A/D converter 25 obtained immediately before the change-over. The output of the holding circuit 351 is supplied to an adder 352 to be added together with the output of an up-down counter 34. The output of the adder 352 is supplied to a gain correction circuit 353. The circuit 353 then produces a gain-corrected aperture control signal. The gain-corrected aperture control signal is supplied to a subtracter 354 to be compared with the detection signal which represents an aperture value and is output from the A/D converter 27. A signal representing a difference between the two inputs to the subtracter 354 is supplied to an amplifier 355 to be amplified up to a given level. The amplified difference signal thus obtained is supplied to the D/A converter 26 to form thereby an aperture control feedback loop for keeping a video signal level unvarying.

The gain correcting action of the gain correction circuit 353 is performed in the following manner: the control signal which corresponds to the aperture value and is output from the A/D converter 27 is supplied to an area determining circuit 356. The circuit 356 then determines one of a plurality of preset steps to which the aperture value of the signal belongs. The result of determination is supplied to the gain correction circuit 353. The gain correction circuit 353 then corrects the gain stepwise according to the plurality of steps on the basis of the aperture value information supplied from the area determining circuit 356. The gain correction characteristic of the circuit 353 is as represented by the curve $l_2$ of FIG. 19 which is a broken line. Each segment of the broken line curve $l_2$ represents one of the plurality of steps. The curve is finely divided into many segments to give a high degree of accuracy. The number of gain correction steps is suitably determined within the range of precision of the iris aperture encoder. By virtue of this correcting arrangement, the uncorrected loop gain which is represented by a curve $l_1$ in FIG. 19 is corrected into an unvarying loop gain as represented by a curve $l_3$.

With the embodiment arranged as described above, when the automatic mode is selected by setting the switch 19 on the side of its contact 19A, the output of the A/D converter 25 is supplied to the adder 325 passing through the holding circuit 351. Meanwhile, the up-down counter 34 is reset at its initial value by the switch 19 and remains in an inoperative state. Therefore, only a fixed initial value is supplied from the counter 34 to the adder 352. This nullifies the output of the counter 34 even if the up switch 21 or the down switch 22 is operated.

Under this condition, the aperture control loop gain which is of the characteristic represented by the curve $l_1$ of FIG. 19 is corrected by the correcting action of the inverse characteristic represented by the curve $l_2$. As a result, the aperture control loop gain has a characteristic which is almost unvarying over the whole iris shifting range as represented by the curve $l_3$. This enables the aperture to be smoothly controlled.

In the event of change-over to the manual mode, the holding circuit 351 holds the output of the A/D converter 25 which is obtained immediately before the change-over. The output of the converter 25 which is thus held is continuously supplied to the adder 352. Meanwhile, the up-down counter 34 is rendered operative after it is reset.

The output of the A/D converter 25 obtained immediately before the change-over to the manual mode becomes the initial value of the manual control operation. To this value is added the output of the aperture controlling up-down counter 34. The sum value thus obtained is supplied to the gain correction circuit 353. Then, the loop gain of the aperture control system is controlled to make it unvarying in the manner as described above. As a result, the loop gain becomes unvarying over the whole range of the shiftable aperture positions of the iris. In other words, the rate of exposure variations in relation to the degree of operation of the up switch or the down switch provided for aperture control remains almost unvarying over the whole aperture shiftable range. The varying degree of aperture in response to each push given to the up switch or the down switch remains unchanged irrespective as to whether the iris position is on the large aperture side or on the small aperture side. This is a great improvement in operability. An exposure can be manually accomplished in an optimum manner as the loop gain of the iris control circuit is corrected to be constant irrespective of the aperture value to enable the iris to act in exact proportion to the operation of the exposure varying up or down switch.

In the fifth embodiment described above, the aperture correction control circuit is arranged in a microcomputer (microprocessor). However, this circuit can be arranged in the form of hardware.

Figure 20:
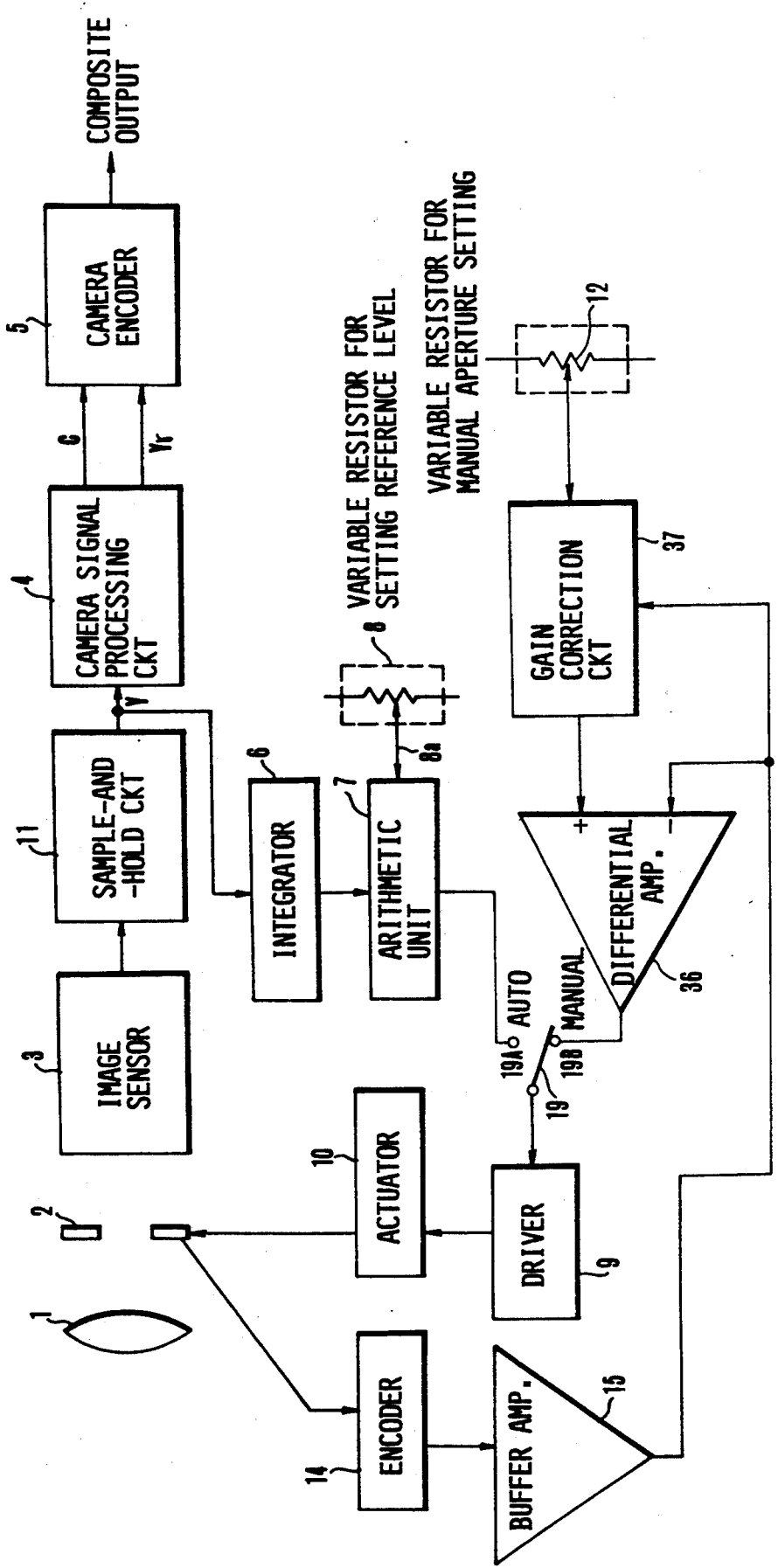
FIG. 20 is a block diagram showing a sixth embodiment of the invention.

FIG. 20 shows one example of it in a block diagram as a sixth embodiment of this invention. In FIG. 20, parts arranged in the same manner as those of FIG. 17 are indicated by the same reference numerals and the details of them are omitted from description. In the case of the sixth embodiment, the gain correction is made only in the manual aperture control mode wherein, during the control operation, the exposure is strongly affected by the change of loop gain caused by the aperture value.

Referring to FIG. 20, an operation member 12 is provided for a manual operation on the iris by means of a variable resistor which is interlocked with an iris operation ring which is not shown. A differential amplifier 36 is arranged to compare an aperture value detection signal which corresponds to an aperture value and is output from a buffer amplifier 15 with a control signal which corresponds to an aperture setting value set by the iris operation member and to produce an aperture control signal which is formed according to a difference between these two input signals. The aperture control signal is supplied to a driver 9. A gain correction circuit 37 is arranged to correct the gain of the setting value set by the iris operation member on the basis of the aperture value data supplied from the buffer amplifier 15 in such a way as to make the loop gain of an aperture control feedback loop unvarying. The original loop gain of this aperture control feedback loop has the characteristic which is as represented by the curve $l_1$ of FIG. 19. The gain control circuit 37 corrects this loop gain characteristic by applying correction data of a characteristic which is the inverse thereof as represented by the curve $l_2$ of FIG. 19. As a result, the loop gain comes to have a characteristic which is almost unvarying as represented by the curve $l_3$ in FIG. 19.

When an automatic aperture control mode is selected by setting an automatic-manual change-over switch 19 in its automatic mode position, a signal which is formed by an arithmetic unit 7 on the basis of a difference between the image signal level and a reference value is supplied to a driver 9. Then the driver 9 drives an actuator 10 to adjust the aperture value of the iris 2 in such a way as to make this difference either unchanging or become zero. In other words, the operation of the sixth embodiment in the automatic exposure control mode is the same as in the case of FIG. 2.

Next, when a manual aperture control mode is selected by setting the change-over switch 19 in its manual position (a contact 19B), the arithmetic unit 7 ceases to supply the signal relative to the image signal level. The output of the differential amplifier 36 is then supplied to the driver 9 for the actuator 10. Therefore, a signal which is output from the buffer amplifier 15 relative to the aperture value position of the iris and the aperture setting value of the manual iris operating variable resistor 12 which comes from the gain correction circuit 37 are supplied to the differential amplifier 36. The differential amplifier 36 compares the two inputs and produces a signal relative to a difference between them. The iris is controlled according to this difference signal. As a result, the aperture value of the iris 2 is adjusted to a value corresponding to the value set by means of the iris operating variable resistor 12.

In the case of manual control, as shown in FIG. 19, the gain correction circuit 37 corrects the aperture control feedback loop gain which is represented by the curve $l_1$ according to the aperture value by applying the gain correction thereto represented by the curve $l_2$ in FIG. 19. As a result, the loop gain is kept in a constant state as represented by the curve $l_3$ in FIG. 19. Therefore, like in the case of the fifth embodiment, the relation of the manual operating degree to the actual change of the aperture can be kept unvarying, so that the iris aperture is adjustable always in a natural manner.

Figure 21:
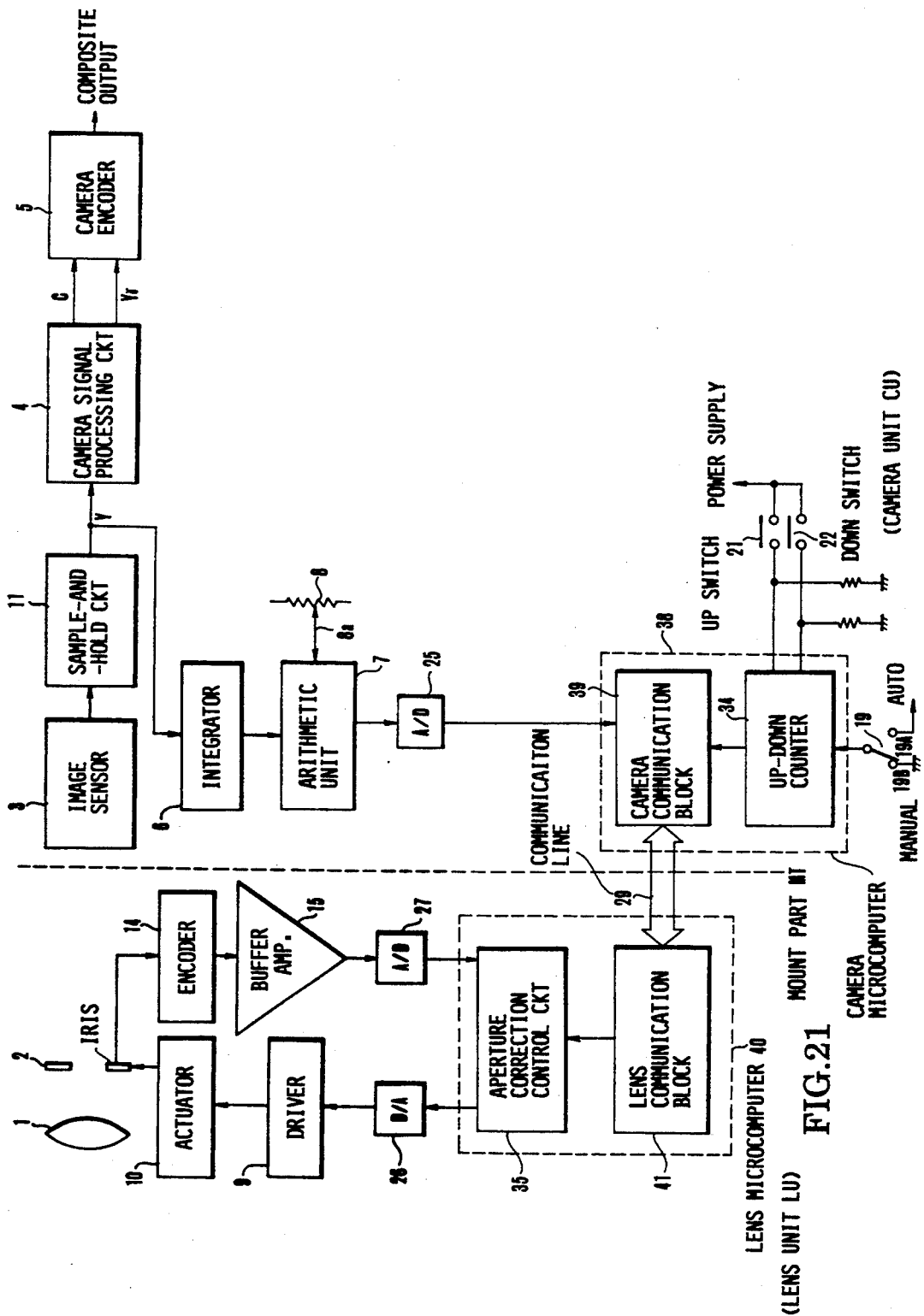
FIG. 21 is a block diagram showing a seventh embodiment of the invention.

FIG. 21 shows a seventh embodiment of the invention, wherein the exposure control device of this invention is applied to an interchangeable lens type video camera. In FIG. 21, parts arranged in the same manner as those of FIG. 17 are indicated by the same reference numerals and the details of them are omitted from the following description. The illustration includes a lens unit LU, a camera unit CU and a mount part MT which couples the lens unit LU with the camera unit CU. The mount part MT is provided with electric contact connectors for control data communication between the two units.

The camera unit CU is arranged as follows: there are provided an image sensor 3; a sample-and-hold circuit 11; a camera signal processing circuit 4; and a camera encoder 5. An integrator 6 is arranged to integrate the luminance signal component of a video signal output from the sample-and-hold circuit 11. An arithmetic unit 7 is arranged to compare the output of the integrator 6 with a reference value 8a which is set by a reference level setting variable resistor 8 and to produce a signal relative to a difference between them. An A/D converter 25 is arranged to convert the output of the arithmetic unit 7 into a digital signal. A change-over switch 19 for selection between an automatic aperture control mode and a manual aperture control mode; a manual aperture setting "up" switch 21; and a manual aperture setting "down" switch 22 are arranged in the same manner as in the case of the fifth embodiment shown in FIG. 17. The luminance signal level data which is output from the A/D converter 25 and the data of a degree to which the aperture value setting operation switch is operated are supplied to a microcomputer 38 (hereinafter referred to as a camera-side microcomputer) which is disposed on the side of the camera unit and controls the operation of the camera unit. The camera-side microcomputer 38 receives the output of an up-down counter 34 which indicates the operation degree of the manual aperture setting switch 21 or 22 and the output of the A/D converter 25 as mentioned above. The microcomputer 38 is arranged to compute an aperture control signal by performing a computing operation on these inputs. The aperture control signal is converted by a camera communication block 39 into a form suited for communication to be conducted via a communication line 29 with another microcomputer 40 which is disposed on the side of the lens unit LU.

The lens unit LU is arranged as follows: the microcomputer 40 (hereinafter referred to as a lens-side microcomputer) is arranged to exchange control data with the camera-side microcomputer 38 through the communication line 29. More specifically, the lens-side microcomputer 40 is arranged to receive aperture control data from the camera-side microcomputer 38 via a lens communication block 41 and to control an iris 2 via an aperture correction control circuit 35 on the basis of the control data. Further, the lens-side microcomputer 40 is arranged to take therein aperture value data from an iris aperture encoder 14, a buffer amplifier 15 and an A/D converter 27 and to perform a correcting action of an inverse characteristic which is represented by the curve $l_2$ of FIG. 19 on the aperture control data which is received from the camera-side microcomputer 38 and has a characteristic represented by the loop gain characteristic curve $l_1$ of FIG. 19. The loop gain characteristic is thus corrected into a characteristic which is represented by the curve $l_3$ of FIG. 19. After the correcting action, the corrected aperture control data is converted into an analog signal by a D/A converter 26. The analog aperture control signal thus obtained is supplied to a driver 9 and an actuator 10 to be used for controlling the iris 2.

The internal arrangement of the lens-side microcomputer 40 includes the aperture correction control circuit 35 which is arranged as shown in FIG. 18 and the above-stated communication block 41.

When the automatic-manual change-over switch 19 is on the side of its contact 19A thus selecting the automatic control mode, the count value of the up-down counter 34 which is disposed within the camera-side microcomputer 38 is fixed to a given value to nullify any operation on the manual aperture setting switches 21 and 22. The aperture control data is sent to the lens unit and the iris 2 is controlled in such a way as to keep the luminance level of the video signal unvarying.

When the position of the switch 19 is shifted to the other contact 19B thereof to select the manual control mode, the up-down counter 34 produces a signal indicating an aperture value manually set by the switch 21 or 22. The signal output from the counter 34 is added to video signal level data which is supplied from the A/D converter 25, so that the aperture can be controlled and adjusted to the value manually set. The communication block 39 of the lens-side microcomputer 40 receives from the communication block 39 of the camera-side microcomputer 38 the output data of the A/D converter 25 and the output of the up-down counter 34 and supplies them to the aperture correction control circuit 35. The circuit 35 is composed of the holding circuit 351, the adder 352, the gain correction circuit 353, the area determining circuit 356, the subtracter 354 and the amplifier 355 and operates in the same manner as in the case of the fifth embodiment with the exception that the communication block is arranged before it for the communication with the camera unit. More specifically, the data from the A/D converter 25 is held by the holding circuit 351 and is added by the adder 352 to the output of the up-down counter 34. A signal obtained as a result of the addition is corrected by the gain correction circuit 353 in such a way as to make the aperture control loop gain to be unvarying for all the aperture value positions of the iris. The output of the gain correction circuit 353 is then compared with digital aperture value data output from the A/D converter 27. A difference signal thus obtained is amplified by the amplifier 355. The amplified difference signal is supplied to the driver 9 via the D/A converter 26. In accordance with this signal, the driver 9 drives the actuator 10 to vary the aperture position of the iris accordingly. The aperture position or value of the iris is converted into a voltage by the encoder 14 and is fed back to the aperture correction control circuit 35 via the buffer amplifier 15 and the A/D converter 27.

The interchangeable lens system as described above has the aperture correction control circuit 35 disposed on the side of the lens unit. The camera unit is, therefore, required to simply receive the output of the up-down counter 34. This arrangement enables the lens unit to permit manual exposure correction in an optimum manner, because the actuator 10 and the iris 2 are controlled on the side of the lens unit irrespective of the kind of the camera unit.

Further, in the case of the seventh embodiment described, the manual aperture setting switches 21 and 22 (or an exposure-varying variable resistor) and the up-down counter 34 are disposed on the side of the camera unit. However, they may be arranged on the side of the lens unit in practicing this invention.

In the manual aperture control mode, each of the embodiments described detects, by means of the up-down counter, the degree of operation performed on the manual aperture setting switches 21 and 22 and corrects, according to each aperture value, the degree to which the iris is driven relative to the manual operation degree.

In the case of an eighth embodiment, the varying degree of the counted value of the up-down counter 34 in response to the same degree or the same repeating number of times of operation on the manual aperture controlling "up" or "down" switch 21 or 22 is arranged to be differentiated accordingly as the aperture value varies. BY this arrangement, the degree of change of the aperture control data taking place in relation to the output of the up-down counter 34 can be made unvarying irrespective of the aperture value. Therefore, the aperture control computation algorithm can be simplified.

More specifically, the eighth embodiment is arranged to have the degree of change of the counted value of the up-down counter 34 which takes place in response to each pushing stroke of the up or down switch come to increase according as the iris is shifted from its small aperture value position toward a larger aperture position. This arrangement obviates the necessity of further arrangement for correction.

Figure 22:
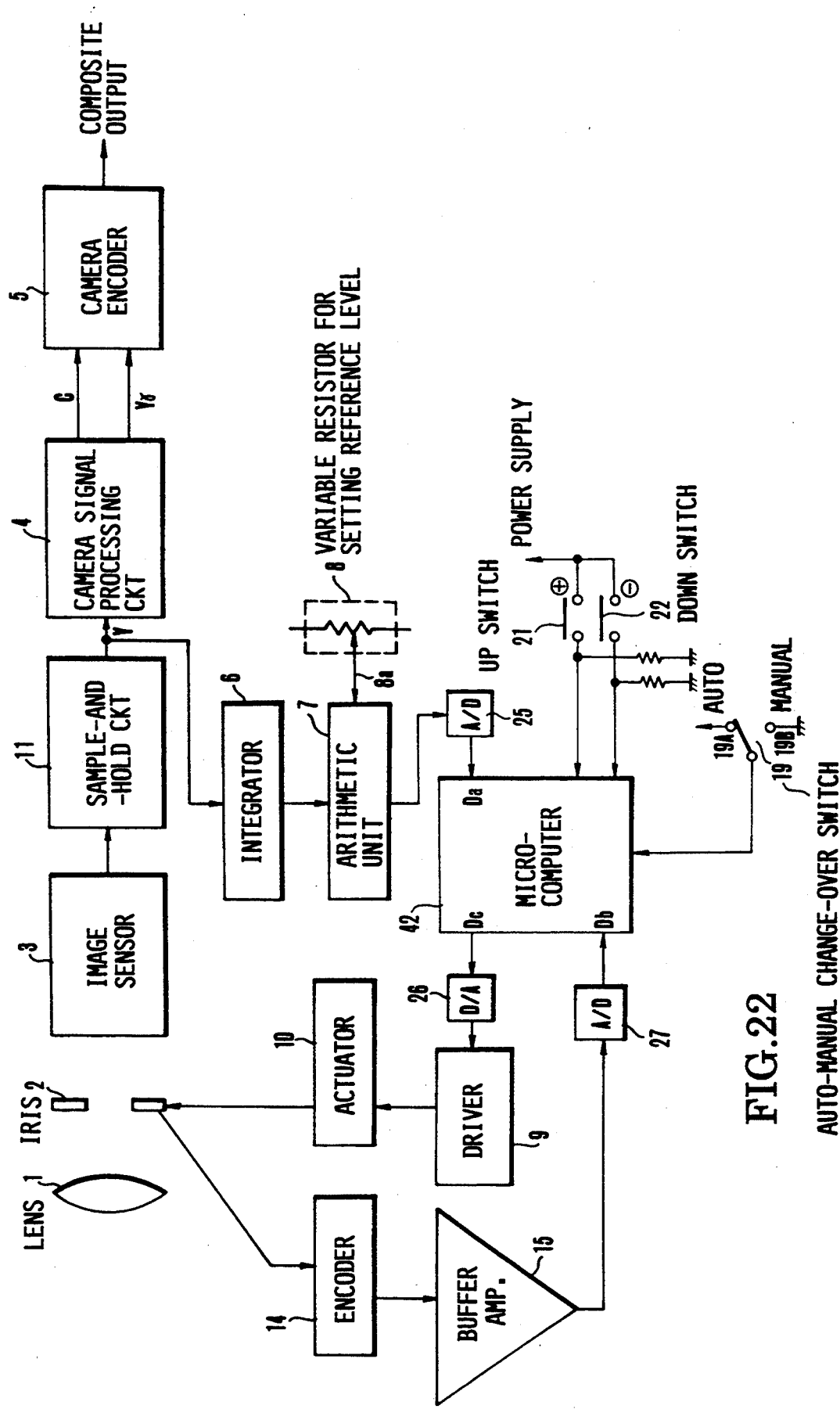
FIG. 22 is a block diagram showing an eighth embodiment of the invention.
Figure 23:
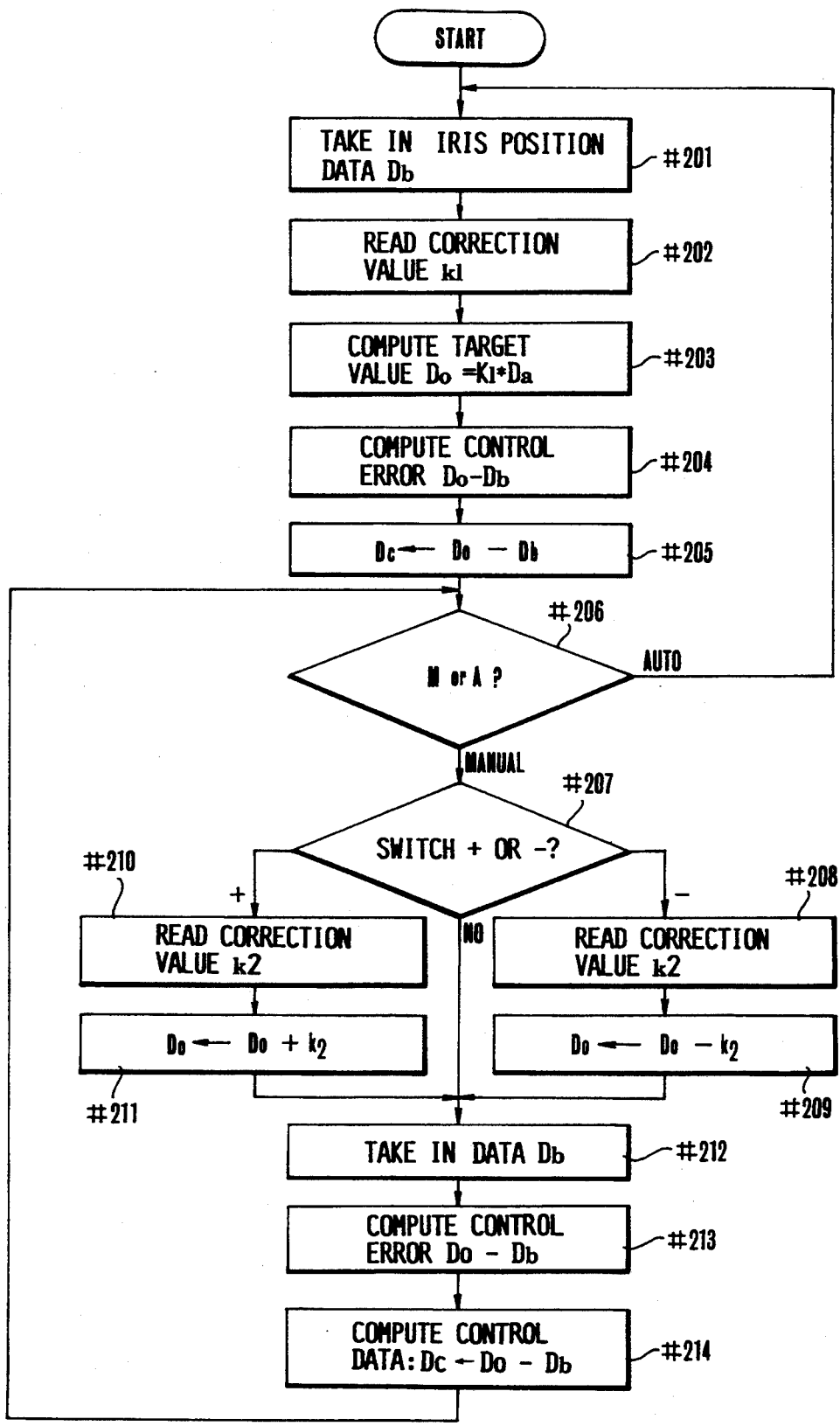
FIG. 23 is a flow chart showing the operation of the eight embodiment.

FIG. 22 shows in a block diagram the arrangement of the eighth embodiment mentioned above. With the exception of the program of a microcomputer, this embodiment is arranged in the same manner as the fifth embodiment. The control operation of this embodiment is as shown in FIG. 23 which is a flow chart.

Referring to FIG. 22, the outputs of the A/D converters 25 and 27, those of the manual aperture setting switches 21 and 22 and the output of the automatic-manual change-over switch 19 are supplied to a control microcomputer 42 as data input while that of the D/A converter 26 is produced from the microcomputer as data output.

The control operation of the control microcomputer 42 of the eighth embodiment is as described below with reference to FIG. 23 which is a flow chart:

Step #201: Information on the position of the iris 2 which is detected by the encoder 14 is taken into the microcomputer 42 as aperture value data Db. Step #202: A correction value K1 which corresponds to the aperture value data Db is read out from a correction value memory which is not shown but is disposed within the microcomputer 42. The correction value (or coefficient) K1 varies with the aperture value in a manner as represented by the correction characteristic curve $l_2$ in FIG. 19. Step #203: Image (video) signal level data Da which is output from the A/D converter 25 for exposure control is taken into the microcomputer 42. A target value Do (K*Da) is computed for controlling the iris 2.

Step #204: A control error data (Do−Db) which indicates a difference between the target value and the aperture value is computed. Step #205: The control error data is substituted for control output data Dc. Step #206: The position of the switch 19 is checked to make a discrimination between selection of a manual mode (M) and an automatic mode (A). In the case of A, the flow of operation comes back to the step #201 to form thereby an automatic control loop. In the event of M, the flow proceeds to a next step #207.

Step #207: A check is made for an instruction for correction to find if a pulse value correction is instructed by the switch 21 or a minus value correction is instructed by the switch 22 or no instruction is received. If the minus value correction is instructed, the flow comes to a step #208. Step #208: A correction coefficient K2 is read out from the memory table of the microcomputer 42 like in the case of the coefficient K1. The coefficient K2 is set in conformity with the gain correction curve of FIG. 19 basically in the same manner as the coefficient K1. A difference between the two lies in that the coefficient K2 is defined to be a count number obtained when the manual correction switches 21 and 22 are pushed. In other words, the degree to which the counted value of the up-down counter changes per pushing stroke of the manual aperture setting switch varies with the aperture value in such a manner as to conform to the curve $l_2$, so that the aperture control loop gain can be corrected to be unvarying. The correction is made in a manner which is, for example, equivalent to arranging a counter in the following manner: the count of the counter is weighted for small apertures in such a way as to change the count number by several count points per pushing stroke of the switch for a small aperture and only by one per pushing stroke in the case of a large apertures.

Step #209: The target value Do is replaced with a value (Do−K2) which includes a correction value obtained under the manual control. In the case of the plus value correction, the flow comes to a step #210.

Step #210: In the case of the plus value correction, the correction coefficient K2 is read out from the memory table of the microcomputer 42 in the same manner as the coefficient K1. Step #211: The target value Do is replaced with a value (Do+K2) which includes a correction value obtained in the manual control mode.

Step #212: The data Db output from the A/D converter 27 is taken into the microcomputer for reconfirmation of the current aperture position of the iris. Step #213: The latest control error (Do−Db) is computed. Step #214: The control error data thus obtained is substituted for the data Do as control data and the flow comes back to the step #206. The aperture is controlled in this manner on the basis of the data obtained.

The embodiment is thus arranged to be capable of performing aperture control with an unvarying loop gain both in the automatic and manual control modes. The arrangement gives a good operation feeling in controlling the aperture without hunting and any unnaturalness.

The exposure control device according to this invention is capable of smoothly and stably performing an aperture control operation for exposure control of a video camera or the like, by virtue that the substantially constant loop gain is ensured irrespective of the aperture value position of the iris by the provision of the non-linearity correcting system of an inverse characteristic. The iris driving characteristic is arranged to saliently vary according to the aperture value, so that hunting and other instability can be prevented from occurring especially on the small aperture side of the iris without impairing the operability of the camera.

In accordance with this invention, the correction characteristic of the aperture control system can be programmed in the form of a table within a microcomputer for smooth aperture control. In cases where the camera is arranged to use an interchangeable lens like in the case of the third embodiment described in the foregoing, control and correction data which is arranged according to the characteristic of the iris lens optical system is stored on the side of the lens unit. This gives a great advantage in terms of the interchangeability of the lens.

It is a further advantage that the correction characteristic can be set at an operation part, so that, in the control system, the arrangement of circuit elements ensuing the operation part can be simplified.

Figure 24:
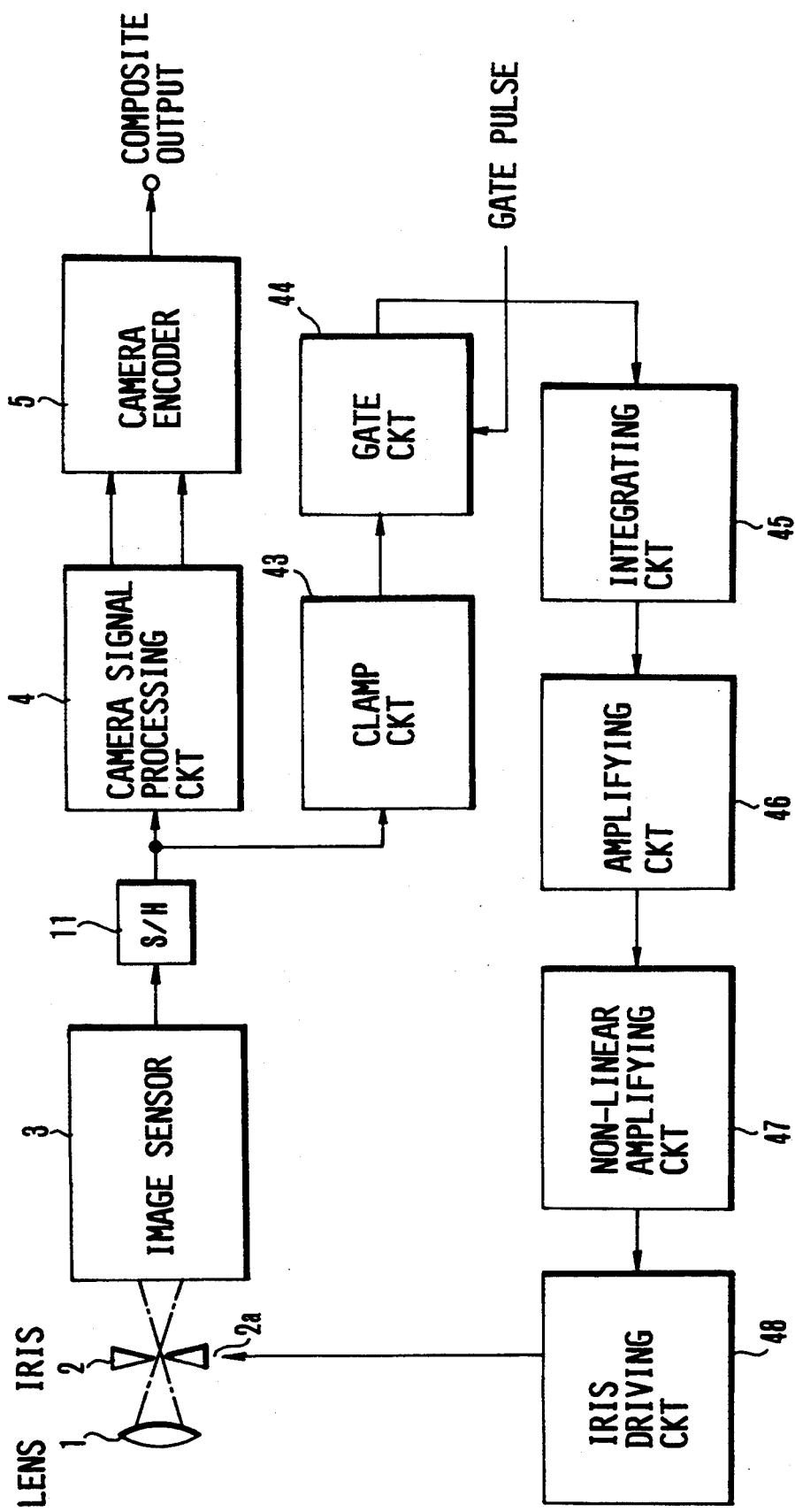
FIG. 24 is a block diagram showing a video camera arranged as a ninth embodiment of the invention.

A ninth embodiment of this invention is arranged as described below:

The ninth embodiment is characterized particularly by the arrangement of a gain compensating non-linear amplifier included in an analog control system which is arranged to correct the non-linearity of the above stated relation between the aperture value and the aperture varying degree. FIG. 24 shows in a block diagram a video camera having an automatic iris control circuit arranged according to this invention and its ninth embodiment.

Referring to FIG. 24, a light flux coming from an object via a lens 1 and an iris 2 of an optical system forms an image on an image sensor 3. The image sensor 3 forms an image signal according to the image forming state of the incident light. The image signal is supplied to a sample-and-hold (hereinafter referred to as S/H) circuit 11 to be converted into a sampled image signal. The image signal output from the S/H circuit 11 is supplied to a camera signal processing circuit 4. The circuit 4 then produces a luminance signal Y and a chrominance signal C in the form of video signal. The video signal is supplied to a camera encoder 5 which conforms, for example, to the NTSC signal transmission system. The camera encoder 5 then produces the signal in the form of a composite video signal from the camera part.

Meanwhile, the image signal output from the S/H circuit 11 is also supplied to a clamp circuit 43 to be clamped for use as an aperture control signal in controlling the iris 2 for an exposure apposite to the luminance state of the image plane of the image sensor 3. More specifically, the sampled image signal is supplied to a gate circuit 44. The gate circuit 44 is arranged to set a light measuring area in a given position on the image plane of the image sensor 3. At the gate circuit 44, only a part of the image signal that corresponds to the light measuring are is extracted. The extracted image signal is supplied to an integrating circuit 45. The integrating circuit 45 is arranged to integrate and smoothen the image signal into a signal which is close to a DC signal. The output of the integrating circuit 45 is supplied via an amplifying circuit 46 to a non-linear amplifying circuit 47 which is arranged to serve as response speed correcting control means according to this invention. At the non-linear amplifying circuit 47, the signal output from the circuit 46 is corrected in such a way as to cause the iris 2 to always have an adequate response speed in both cases where the iris 2 is shifted from a large aperture position to a small aperture position and vice versa. The signal thus corrected is supplied to an iris driving circuit 48 for controlling an iris device 2a.

Figure 26:
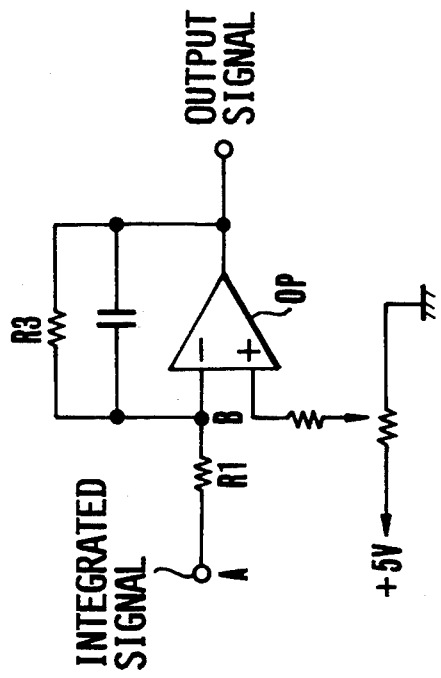
FIG. 26 shows by way of example the arrangement of a linear amplifying circuit heretofore employed in general.
Figure 25:
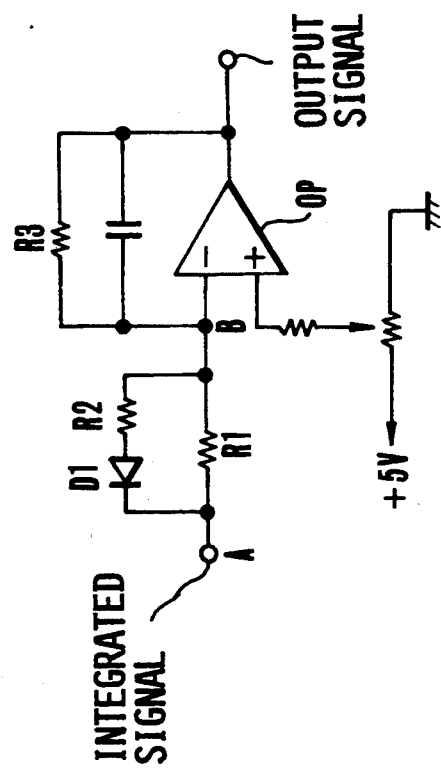
FIG. 25 shows the details of a non-linear amplifying circuit shown in FIG. 24.
Figure 27:
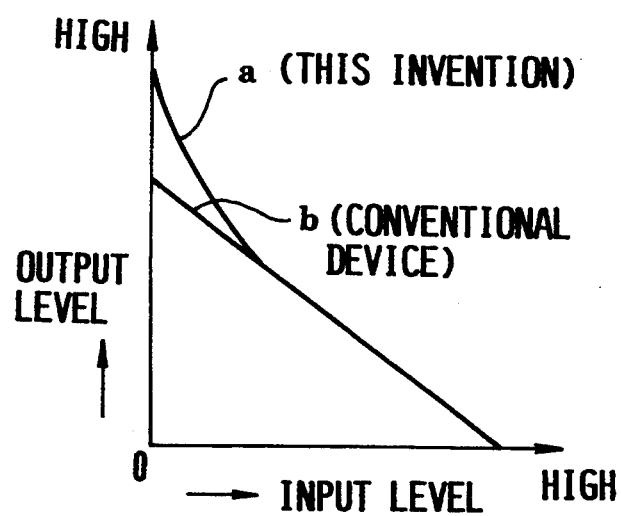
FIG. 27 shows the gain characteristic of the non-linear amplifying circuit of FIG. 25 and that of the linear amplifying circuit of FIG. 26 in comparison with each other.

FIG. 25 shows by way of example the arrangement of the above-stated non-linear amplifying circuit 47. FIG. 26 shows the arrangement of the conventional linear amplifying circuit which corresponds to the circuit 47 for the sake of comparison. Referring to FIG. 25, in accordance with this invention, a semiconductor element D1 which is a Schottky element or a diode and a resistor R2 are arranged in series and are connected in parallel to the two ends of a resistor R1 which is included also in the conventional circuit shown in FIG. 26. With the invented circuit 47 arranged in this manner, when the voltage of the integrated input signal coming to a point A from the integrating circuit 45 becomes lower than the voltage of the inverting input terminal (point B) of an operational amplifier OP, the semiconductor element D1 becomes conductive to amplify the gain of the inverting operational amplifier OP. FIG. 27 shows the gain characteristic (output level/input level ratio) of the conventional inverting amplifier (FIG. 26) and that of the non-linear type inverting amplifier (FIG. 25) in comparison with each other. While the amplifier gain of the conventional arrangement (FIG. 26) has a linear characteristic as represented by a curve "b", that of the invented arrangement (FIG. 25) has a non-linear characteristic as represented by a curve "a" in FIG. 27. The invented arrangement enables the embodiment to cause the iris 2 to act at an adequate response speed through the iris driving circuit 48.

Figure 28:
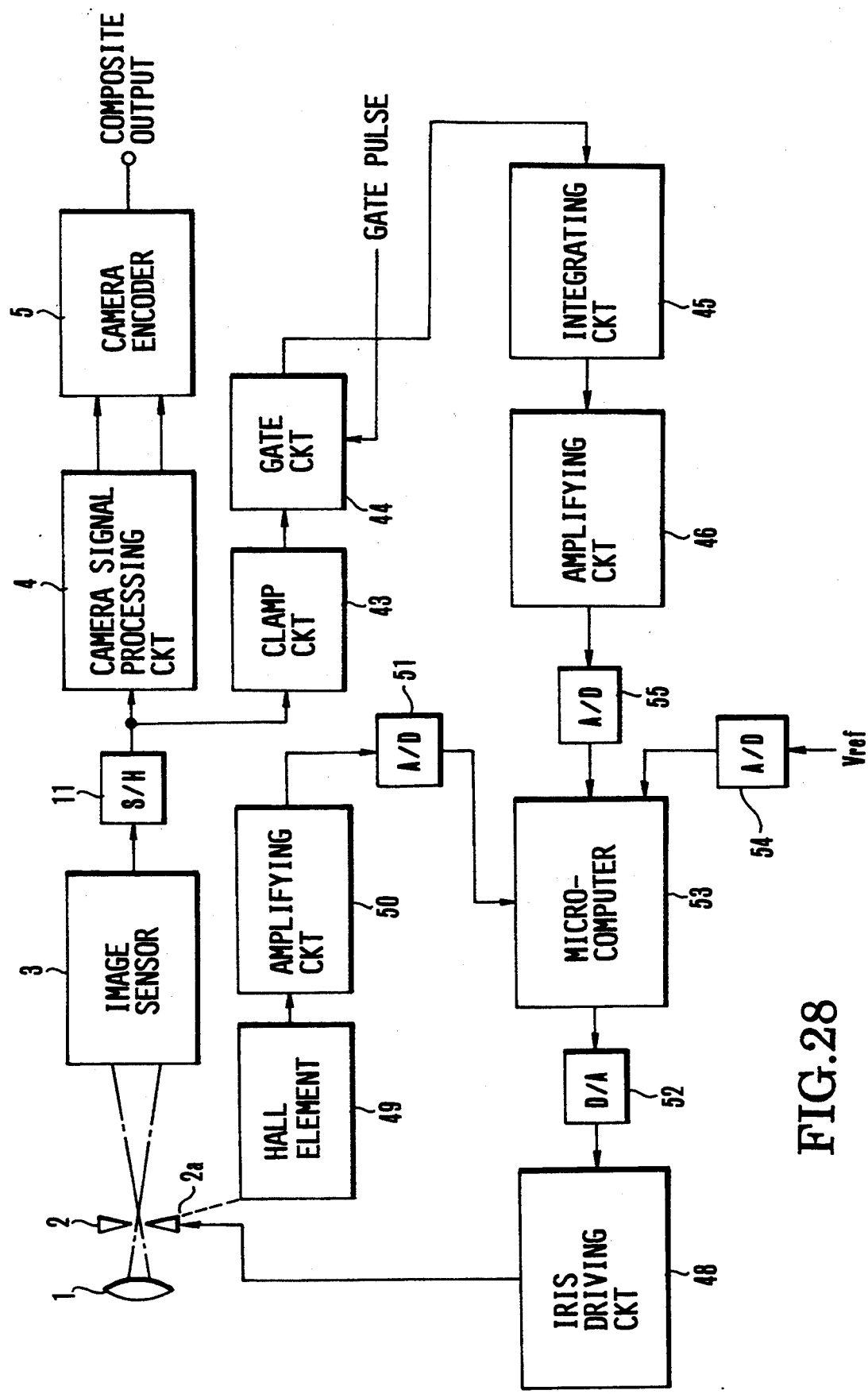
FIG. 28 is a block diagram showing a video camera arranged according to this invention as a tenth embodiment thereof.

FIG. 28 shows in a block diagram the arrangement of a tenth embodiment of the invention. In FIG. 28, parts arranged in the same manner as those of the ninth embodiment shown in FIG. 24 are indicated by the same reference numerals. The tenth embodiment uses aperture value (opening degree) detecting means, such as a Hall element 49, in place of the non-linear amplifying circuit 47 of the ninth embodiment and is arranged to obtain a predetermined correction signal by means of a microcomputer 53.

An image signal which is output from an image sensor 3 is smoothened by an integrating circuit 45 and is amplified up to a given level by an amplifying circuit 46 in the same manner as in the case of the ninth embodiment. The analog value of the signal thus obtained is converted into a digital value by an A/D conversion circuit 55. The digital data is supplied to the microcomputer 53.

Meanwhile, the aperture value of an iris 2 is detected by the Hall element 49. Information on the aperture value detected is amplified to a given level by an amplifying circuit 50 and is then supplied to an A/D conversion circuit 51 to be converted into digital data. The digital data of the detected aperture value is supplied to the microcomputer 53. A reference voltage Vref which is of an analog value is also converted into a digital value by another A/D conversion circuit 54. The digital reference value thus obtained is also supplied to the microcomputer 53. The microcomputer 53 then performs a correcting operation in the same manner as the curve "a" of FIG. 27.

Figure 29:
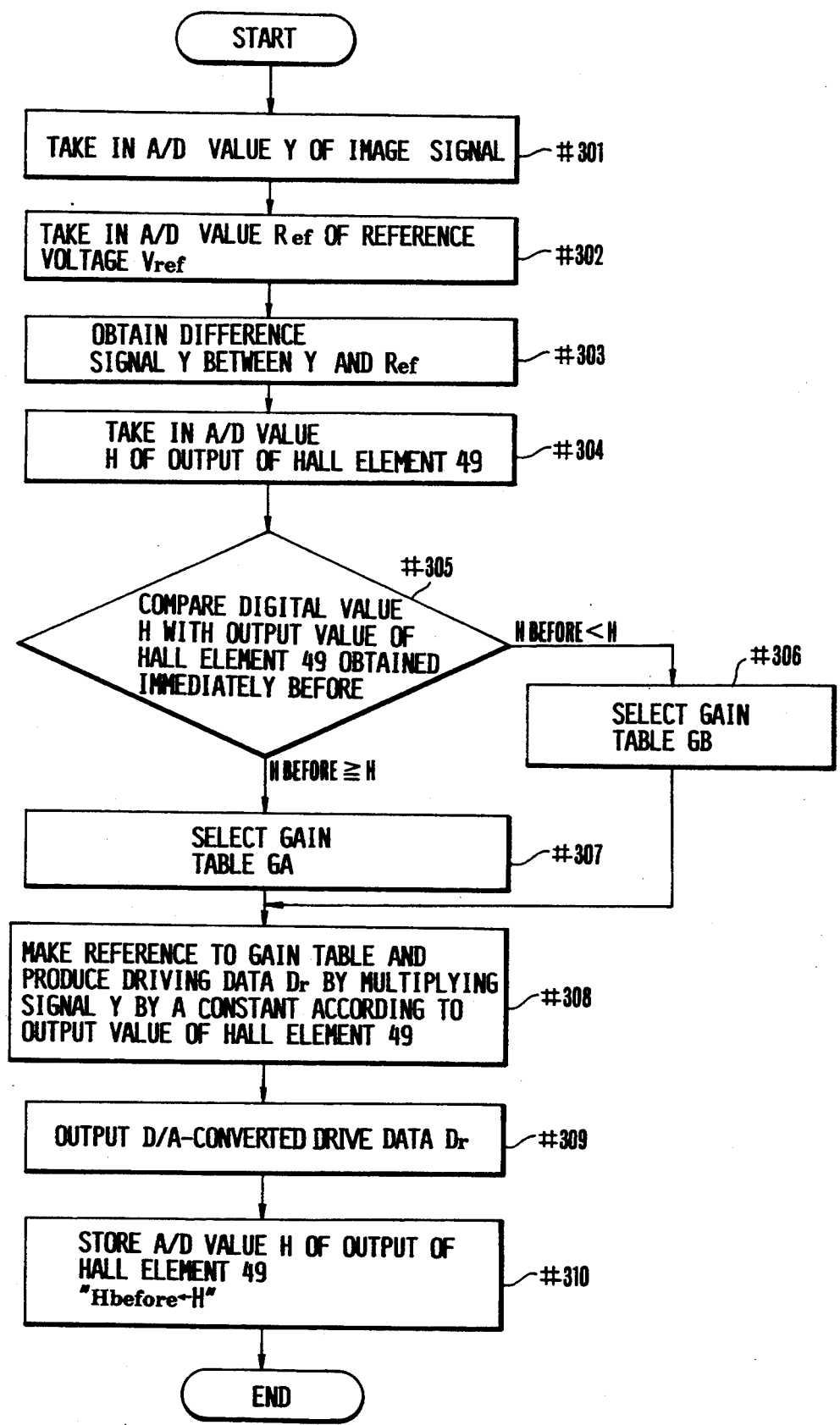
FIG. 29 is a flow chart showing the sequence of operation of a microcomputer included in the tenth embodiment shown in FIG. 28.

FIG. 29 is a flow chart showing the operation of the microcomputer 53. The operation is as described below with reference to the flow chart:

Steps #301 and #302: The microcomputer 53 takes in the digital value Y of the image signal output from the A/D conversion circuit 55 and the digital value Ref of the reference voltage Vref output from the A/D conversion circuit 54. Step #303: A difference signal Y which indicates a difference between the two digital values Y and Ref is obtained. Step #304: The microcomputer 53 takes in a digital value H of the voltage output of the Hall element 49 which is output from the A/D conversion circuit 51. Step #305: The digital value H is compared with a previous digital value Hbefore which has been taken into the microcomputer immediately before. If the value H is larger than the previous value Hbefore, the flow of operation comes to a step #306 to select a gain table GB which will be described later. If the value H is equal to or smaller than the previous value Hbefore, the flow comes to a step #307 to select a gain table GA. These gain tables GA and GB are arranged as shown in Table 1 herein. Predetermined correction values to be used for the output values of the Hall element 49, i.e., the aperture values of the iris are stored beforehand in these gain tables. The above-stated difference signal Y is multiplied by an applicable correction value of the gain table. Then, the flow comes to a step #308 to produce driving data Dr as a result of the multiplication. The correction values of each of the gain table GA and GB are determined in such a way as to make the response speed of the iris substantially adequate when the iris is shifted from a large aperture position to a small (stopped-down) aperture position and vice versa. These gain tables are as shown in Table 1 below:

TABLE 1

| Gain Correction Table | | | |
|---|---|---|---|
| Gain Table GA | | Gain Table GB | |
| F-number | Constant (multiple) | F-number | Constant (multiple) |
| 1.2–2 | 3 | 1.2–2 | 3 |
| 2–2.8 | 2.5 | 2–2.8 | 2.5 |
| 2.8–4 | 1.3 | 2.8–4 | 1.3 |
| 4–5.6 | 1.1 | 4–5.6 | 1.1 |
| 5.6–8 | 1 | 5.6–8 | 1 |
| 8–11 | 1 | 8–11 | 0.6 |
| 11–16 | 0.6 | 11–16 | 0.4 |
| 16– | 0.4 | 16– | 0.3 |

Referring to Table 1 above, the gain table GA is provided for use when the iris is to be shifted from a small aperture position toward a large aperture position and the gain table GB for use when the iris is to be shifted from a large aperture position toward a small aperture position. To eliminate the possibility of hunting occurring at small (or stopped-down) aperture positions and to ensure an optimum response speed, the gain table GB is arranged to reduce the gain correction degree for the small aperture region further than in the case of the gain table GA.

While the F-numbers are divided by eight steps in Table 1 of this embodiment, they may be divided by any other suitable number of steps for gain correction.

With the output signal Dr obtained through the above-stated gain correcting process, the flow comes to a step #309. Step #309: The digital value of the output signal Dr is converted by the D/A conversion circuit 52 into an analog value. The analog signal thus obtained is supplied to the iris driving circuit 48 to cause the iris 2 to be driven at an optimum response speed.

Since the response speed is thus corrected to an optimum speed, the inconstancy of an IG meter or the like can be sufficiently absorbed.

As described in the foregoing, in accordance with this invention, the response speed of the iris control action of the automatic iris control system of an image sensing apparatus such as a video camera can be optimized by a simple circuit arrangement.

What is claimed is:

1. An exposure control device comprising:
   a) photo-electric conversion means arranged to photo-electrically convert incident light;
   b) aperture control means for controlling a state of exposure by forming a feedback loop for adjusting an aperture of an iris in such a way as to make constant the level of a signal output from said photo-electric conversion means;
   c) detection means for detecting an aperture position of said iris; and
   d) correction means arranged to control a responsivity of said iris by correcting a loop gain of said feedback loop of said aperture control means on the basis of an output of said detection means in such a way as to lower the responsivity by decreasing the loop gain when the iris is on the side of small apertures and to enhance the responsivity by increasing the loop gain when the iris is on the side of large apertures, so as to make constant the changing degree of light quantity relative to the driven degree of said iris irrespective of the aperture position of said iris and while said aperture control means is being operated.

2. A device according to claim 1, wherein said correction means is arranged to correct a characteristic of change of light quantity per unit driven degree of said iris which varies with the aperture position of said iris.

3. A device according to claim 2, wherein said photo-electric conversion means is a CCD, and wherein said aperture control means is arranged to control said aperture in such a way as to make constant a luminance level of an image signal output from said CCD.

4. A device according to claim 3, said exposure control device being arranged within a camera system which has a lens unit attachably and detachably included therein, and wherein said correction means is disposed in said lens unit.

5. A lens unit comprising:
   a) aperture control means for controlling a state of exposure by forming a feedback loop which adjusts an aperture value of an iris on the basis of aperture control information supplied from a camera body, in such a way as to make constant a quantity of incident light;
   b) detection means for detecting the aperture value of said iris; and
   c) correction means for controlling and causing a changing rate of said exposure state relative to a change of said iris to be constant by applying to a control value of said aperture control means a correcting process of a characteristic which is inverse to a characteristic of the aperture of said iris and said aperture control means by controlling the loop gain of the feedback loop, said correcting process including an operation to correct a changing rate of light quantity per unit driven degree of said iris which varies with the aperture value of said iris in such a way as to make constant the changing rate of light quantity relative to the driven degree of said iris and being applied on the basis of the aperture value detected by said detecting means while said aperture control means is being operated.

6. A lens unit according to claim 5, wherein said correction means is arranged to control a moving responsivity of said iris by correcting the loop gain of said feedback loop, in such a way as to lower the responsivity by decreasing the loop gain when the iris is on the side of small apertures and to enhance the responsivity by increasing the loop gain when the iris is on the side of large apertures so that the responsivity can be kept unvarying as a whole.

7. An exposure control device comprising:
   a) iris driving means for varying a degree of exposure by driving an iris;
   b) operation means arranged to supply iris operating information to said iris driving means and to control an exposure value by driving said iris;
   c) detection means for detecting information on an aperture value of said iris; and
   d) control means for controlling the characteristic of driving responsivity of said iris irrespective of the aperture value by controlling a loop gain of said iris driving means on the basis of an iris control signal output from said operation means, said control means being arranged to control a varying rate of said iris relative to the iris control signal according to the aperture value detected by said detection means so as to correct a changing rate of light quantity per unit driven degree of said iris which varies with the aperture value of said iris in such a way as to make constant the changing rate of light quantity relative to the driven degree of said iris and while said operation means is being operated.

8. A device according to claim 7, wherein said control means is arranged to correct a characteristic of a varying degree of light quantity per unit driven degree of said iris by changing the varying degree of said iris relative to the iris control signal according to the aperture value detected by said detection means, said varying degree of light quantity per unit driven degree varying with said aperture value.

9. A device according to claim 8, further comprising an up-down counter which is manually operable to supply a setting value of aperture to said control means as an instruction value, and wherein said control means is composed of a microcomputer.

10. A device according to claim 9, wherein said control means is arranged to vary the varying degree of said iris relative to a counted value of said up-down counter according to the aperture value detected by said detection means.

11. A device according to claim 10, wherein said control means is arranged to control the responsivity of said iris irrespectively of the aperture value by controlling the loop gain of said iris driving means.

12. A camera system having a camera body and a lens detachably attached to said camera body, comprising:
   a) iris driving means arranged in said lens to vary an exposure by driving an iris;
   b) operation means arranged in said camera body to control a state of exposure by supplying iris operating information to said iris driving means to cause said iris to be driven accordingly;
   c) detection means arranged on the side of said lens to detect information on an aperture value of said iris;
   d) control means arranged in said lens to control the characteristic of the driving responsivity of said iris irrespective of the aperture value by controlling a loop gain of said iris driving means on the basis of an iris control signal output from said operation means and also to control a varying value of said iris relative to the control signal according to the aperture value detected by said detection means in such a way as to make constant the changing rate of light quantity relative to the drive degree of said iris and while said operation means is being operated; and
   e) communication means for sending information on an operation of said operation means from said camera body to said lens.

13. A system according to claim 12, wherein said control means is arranged to correct a characteristic of a varying degree of incident light quantity per unit driven degree of said iris which varies with aperture values, said non-linearity being arranged to be corrected by changing the varying degree of said iris relative to the iris control signal to be linear according to the aperture value detected by said detection means.

14. A system according to claim 13, wherein said operation means includes an up-down counter arranged to be manually operable for setting an aperture value as an instruction value, and wherein said control means is composed of a microcomputer.

15. A system according to claim 14, wherein said control means is arranged to vary the varying degree of said iris relative to a counted value of said up-down counter according to the aperture value detected by said detection means.

16. A system according to claim 12, wherein said control means is arranged to control the responsivity of said iris irrespectively of the aperture value by controlling the loop gain of said iris driving means.

17. A system according to claim 15, wherein said control means is arranged to control the responsivity of said iris irrespectively of the aperture value by controlling the loop gain of said iris driving means.

* * * * *